(12) United States Patent
Kamor et al.

(10) Patent No.: US 11,887,798 B2
(45) Date of Patent: Jan. 30, 2024

(54) SNAP FIT CIRCUIT BREAKER AND LOAD CENTER SYSTEM

(71) Applicant: Leviton Manufacturing Co., Inc., Melville, NY (US)

(72) Inventors: Michael Kamor, North Massapequa, NY (US); Justin Berghoff, Northport, NY (US); Adam Kevelos, Plainview, NY (US); Timothy Lindh, Bellmore, NY (US); Nicholas Ryan Goodine, Bristol, CT (US); Steven Tommell, Meriden, CT (US)

(73) Assignee: Leviton Manufacturing Co., Inc., Melville, NY (US)

( * ) Notice: Subject to any disclaimer, the term of this patent is extended or adjusted under 35 U.S.C. 154(b) by 245 days.

(21) Appl. No.: 17/205,163

(22) Filed: Mar. 18, 2021

(65) Prior Publication Data

US 2021/0202200 A1    Jul. 1, 2021

Related U.S. Application Data

(60) Continuation of application No. 16/793,215, filed on Feb. 18, 2020, now Pat. No. 10,971,319, which is a
(Continued)

(51) Int. Cl.
*H02B 1/04*  (2006.01)
*H01H 71/02*  (2006.01)
(Continued)

(52) U.S. Cl.
CPC ......... *H01H 71/0264* (2013.01); *H02B 1/048* (2013.01); *H02B 1/056* (2013.01);
(Continued)

(58) Field of Classification Search
None
See application file for complete search history.

(56) References Cited

U.S. PATENT DOCUMENTS

| 2,910,630 A | 10/1959 | Hammerly |
| 3,280,379 A | 10/1966 | Ellsworth |

(Continued)

FOREIGN PATENT DOCUMENTS

| CN | 101960936 A | 1/2011 |
| CN | 105393324 A | 3/2016 |

(Continued)

OTHER PUBLICATIONS

International Search Report and Written Opinion for PCT/US2017/036471, dated Sep. 18, 2017, 10 Pages.
(Continued)

*Primary Examiner* — Courtney L Smith
(74) *Attorney, Agent, or Firm* — KDW Firm PLLC

(57) ABSTRACT

A circuit breaker and panel system includes a panel including a base pan having a plurality of base pan electrical connections. A circuit breaker including a housing having a plurality of circuit breaker electrical connections arranged to contact the base pan electrical connections when the circuit breaker is coupled to the base pan. The circuit breaker is rotatably coupleable with the base pan via a pivot joint for engaging the plurality of base pan electrical connections with the plurality of circuit breaker electrical connections per a predetermined electrical connection coupling sequence. One of the housing and the base pan includes a protrusion and the other of the housing and the base pan includes a corresponding recess which, when engaged with each other, retain the housing to the base pan to prevent reverse rotational movement of the breaker with respect to the base pan.

26 Claims, 29 Drawing Sheets

Related U.S. Application Data division of application No. 16/283,996, filed on Feb. 25, 2019, now Pat. No. 10,658,142, which is a division of application No. 15/616,178, filed on Jun. 7, 2017, now Pat. No. 10,262,826.

(60) Provisional application No. 62/347,274, filed on Jun. 8, 2016.

(51) Int. Cl.
  *H02B 1/056* (2006.01)
  *H02B 1/048* (2006.01)
  *H02B 1/20* (2006.01)
  *H02B 1/24* (2006.01)
  *H02B 1/26* (2006.01)
  *H01H 71/08* (2006.01)

(52) U.S. Cl.
  CPC ............ *H02B 1/20* (2013.01); *H02B 1/24* (2013.01); *H02B 1/26* (2013.01); *H01H 71/08* (2013.01)

(56) References Cited

U.S. PATENT DOCUMENTS

| | | | |
|---|---|---|---|
| 3,463,967 A | 8/1969 | Klein | |
| 3,619,727 A | 11/1971 | Hackenbroch | |
| 4,251,851 A | 2/1981 | Diersing et al. | |
| 4,449,296 A | 5/1984 | Luke et al. | |
| 4,536,823 A | 8/1985 | Ingram et al. | |
| 4,646,198 A | 2/1987 | Rich et al. | |
| 4,713,728 A * | 12/1987 | Raabe | H02B 1/056 361/652 |
| 4,740,865 A | 4/1988 | Barner | |
| 4,743,204 A | 5/1988 | Fromm et al. | |
| 5,047,604 A | 9/1991 | Grass et al. | |
| 5,081,560 A | 1/1992 | Donnerstag | |
| 5,179,491 A | 1/1993 | Runyan | |
| 5,272,591 A * | 12/1993 | Blue | H02B 1/056 361/637 |
| 5,272,592 A | 12/1993 | Harris et al. | |
| 5,450,282 A | 9/1995 | Webber et al. | |
| 5,640,294 A | 6/1997 | Caggiano et al. | |
| 5,786,982 A | 7/1998 | Rose et al. | |
| 5,969,937 A | 10/1999 | Rose et al. | |
| 6,266,232 B1 * | 7/2001 | Rose | H02B 1/056 361/627 |
| 6,317,311 B1 | 11/2001 | Middlehurst et al. | |
| 6,472,605 B1 * | 10/2002 | Griffith | H02B 1/056 174/149 R |
| 6,806,799 B2 | 10/2004 | Runyan | |
| 7,298,606 B2 | 11/2007 | M'Sadoques et al. | |
| 7,449,645 B1 | 11/2008 | Flegel | |
| 7,508,653 B2 | 3/2009 | Parlee | |
| 7,957,122 B2 | 6/2011 | Sharp | |
| 8,693,169 B2 | 4/2014 | Diaz et al. | |
| 8,953,306 B2 | 2/2015 | Wheeler et al. | |
| 9,048,054 B2 | 6/2015 | Potratz | |
| 9,673,594 B2 * | 6/2017 | O'Brien | H02B 1/205 |
| 9,742,161 B2 * | 8/2017 | Sharp | H02B 1/04 |
| 9,824,839 B2 | 11/2017 | Watford | |
| 10,381,182 B2 * | 8/2019 | Gibson | H01H 71/0264 |
| 2006/0114648 A1 | 6/2006 | Dixon et al. | |
| 2007/0159776 A1 | 7/2007 | McCoy et al. | |
| 2007/0279166 A1 | 12/2007 | VanderVeen | |
| 2008/0158788 A1 | 7/2008 | Darr et al. | |
| 2009/0084664 A1 | 4/2009 | Flegel | |
| 2011/0002089 A1 | 1/2011 | Sharp | |
| 2011/0176258 A1 | 7/2011 | Creighton et al. | |
| 2012/0132506 A1 | 5/2012 | Potratz | |
| 2014/0168861 A1 | 6/2014 | Potratz et al. | |
| 2015/0380842 A1 | 12/2015 | Pearson | |
| 2016/0064905 A1 | 3/2016 | Natili et al. | |
| 2016/0141134 A1 * | 5/2016 | Pearson | H01H 9/20 200/50.21 |
| 2016/0181768 A1 * | 6/2016 | Sharp | H02B 1/14 439/142 |
| 2016/0181769 A1 | 6/2016 | Walgenbach | |
| 2016/0314926 A1 * | 10/2016 | Watford | H01H 71/025 |
| 2016/0314927 A1 * | 10/2016 | Robinson | H01H 71/082 |
| 2017/0018910 A1 * | 1/2017 | Mittelstadt | H01H 71/08 |
| 2017/0033523 A1 | 2/2017 | Mittelstadt et al. | |
| 2017/0076896 A1 * | 3/2017 | Robinson | H01R 13/111 |

FOREIGN PATENT DOCUMENTS

| | | |
|---|---|---|
| DE | 8618540 U1 | 9/1986 |
| JP | 2005339909 A | 12/2005 |
| WO | 9737409 A1 | 10/1997 |
| WO | 2009110860 A1 | 9/2009 |
| WO | 2014209325 A1 | 12/2014 |

OTHER PUBLICATIONS

Chinese Office Action for Chinese Application No. 201780042847.8, dated Jul. 3, 2020, 13 pages.

* cited by examiner

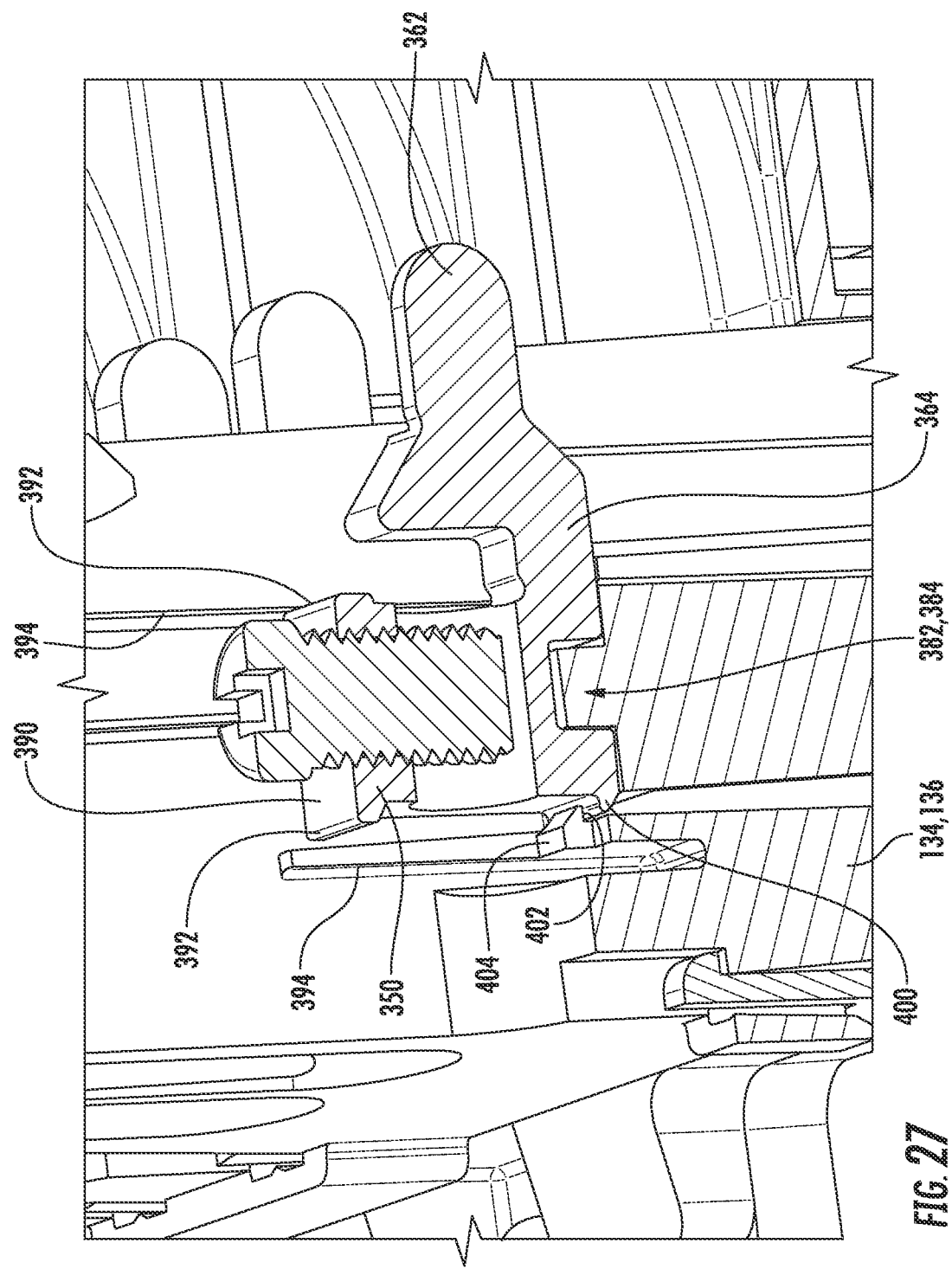

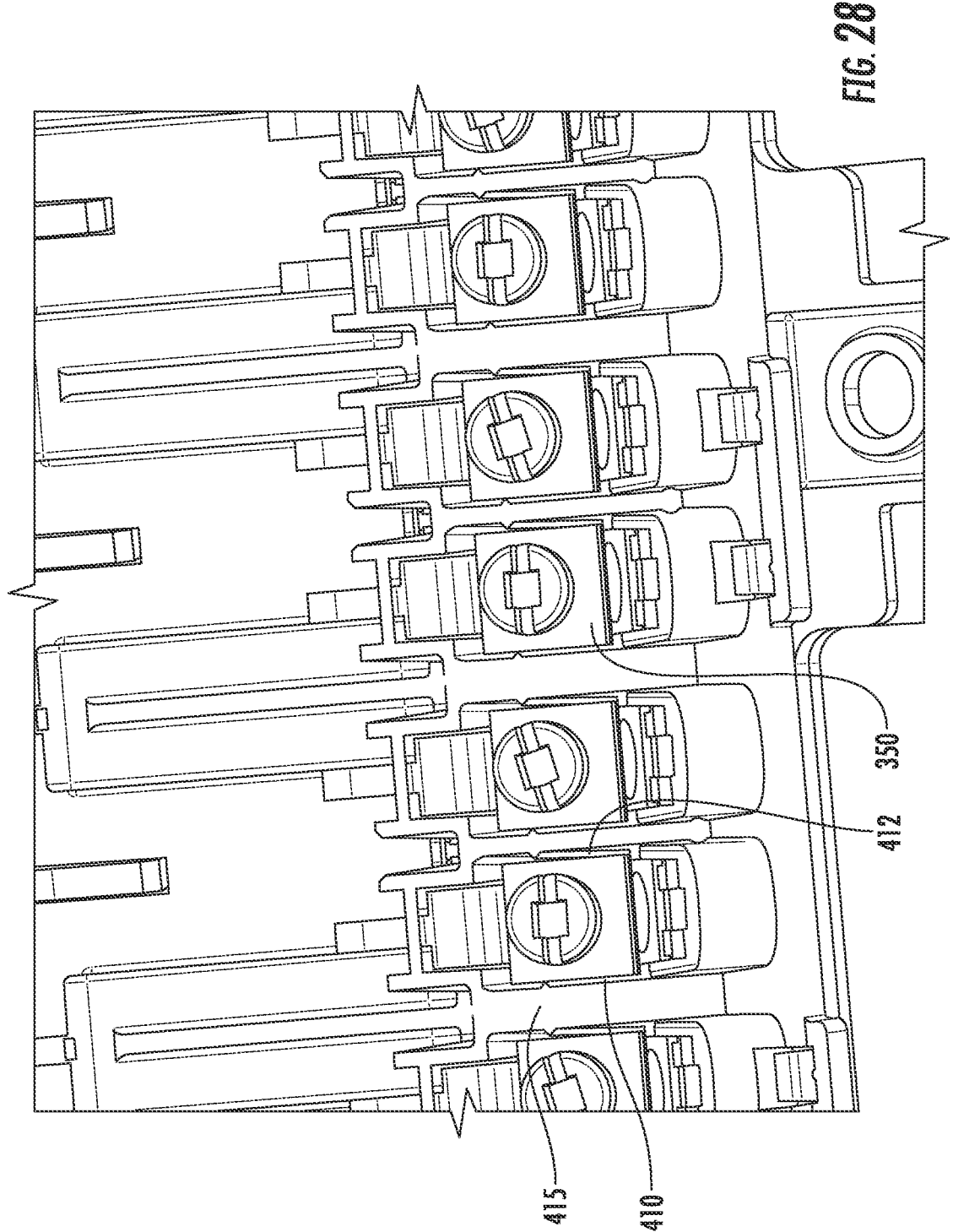

SNAP FIT CIRCUIT BREAKER AND LOAD CENTER SYSTEM

CROSS-REFERENCE TO RELATED APPLICATIONS

The present application is a continuation of co-pending U.S. patent application Ser. No. 16/793,215, filed on Feb. 18, 2020, which is a divisional of U.S. patent application Ser. No. 16/283,996, filed on Feb. 25, 2019, now U.S. Pat. No. 10,658,142, entitled "Snap Fit Circuit Breaker and Load Center System," which is a divisional of U.S. patent application Ser. No. 15/616,178, filed on Jun. 7, 2017, now U.S. Pat. No. 10,262,826, entitled "Snap Fit Circuit Breaker and Load Center System," which application is a non-provisional of, and claims the benefit of the filing date of, and priority to U.S. Provisional Patent Application Ser. No. 62/347,274, filed Jun. 8, 2016, entitled "Snap Fit Circuit Breaker and Load Center System," the entirety of which applications are incorporated by reference herein.

FIELD OF THE DISCLOSURE

The present disclosure relates generally to circuit breaker and panel systems, and more particularly to a circuit breaker and panel system in which the circuit breaker is snapped into the panel and is thus mechanically retained to the panel such that the circuit breaker does not need to be solely retained by any of the electrical connections between the circuit breaker and the panel.

BACKGROUND OF THE DISCLOSURE

In a conventional power distribution system, power from a utility may be fed to a load center which, in turn, feeds a series of branch circuits. To provide high-level protection for the branch circuits, the load center may include a main breaker to control the supply of power from the primary power supply to the branch circuits. To protect the individual branch circuits, the load center can include an individual circuit breaker for each branch circuit.

Conventional circuit breakers are typically coupled to an associated load center via wired and screwed connections. These connections couple the circuit breakers to the load center both electrically and mechanically. As will be appreciated, for load centers employing a large number of individual circuit breakers, the time involved in wiring each circuit breaker to the load center can be substantial.

It would be desirable to provide a circuit breaker and load center system in which the circuit breakers can be installed faster and more efficiently than the current screwed and wired arrangements. For example, it would be beneficial to provide a system that reduces overall wiring time. It would also be desirable to provide mechanical retention features (i.e., those that lock the breaker to the load center) that are separate from the electrical connections. Such a system should also be modular to enable multiple different panel configurations to be built using smaller modules.

SUMMARY OF THE DISCLOSURE

A circuit breaker and load center system is disclosed. The circuit breaker and load center system may include: a panel including a base pan having a plurality of base pan electrical connections; a circuit breaker having a housing, the housing including a plurality of circuit breaker electrical connections, the plurality of circuit breaker electrical connections arranged to contact respective ones of the plurality of base pan electrical connections when the circuit breaker is coupled to the base pan; wherein the circuit breaker is rotatably coupleable with the base pan via a pivot joint for engaging the plurality of base pan electrical connections with respective ones of the plurality of circuit breaker electrical connections according to a predetermined electrical connection coupling sequence; and wherein one of the housing and the base pan includes a protrusion and the other of the housing and the base pan includes a corresponding recess which, when engaged with each other, retain the housing to the base pan to prevent reverse rotational movement of the breaker with respect to the base pan plurality of base pan electrical connections may include a load phase electrical connection, a load neutral electrical connection, a line neutral electrical connection and a line phase electrical connection; and the plurality of circuit breaker electrical connections may include a load phase electrical connection, a load neutral electrical connection, a line neutral electrical connection, and a line phase electrical connection. The circuit breaker may be rotatable about the pivot joint to assume a plurality of rotational positions comprising: a first rotational position in which the circuit breaker load phase and load neutral electrical connections establish electrical contact with respective base pan load phase and load neutral electrical connections; a second rotational position in which the circuit breaker line neutral electrical connection establishes electrical contact with the respective base pan line neutral electrical connection; and a third rotational position in which the circuit breaker line phase electrical connection establishes electrical contact with the respective base pan line phase electrical connection.

As such, in the first rotational position, the circuit breaker line neutral electrical connection and the respective base pan line neutral electrical connection are not in electrical contact with each other, and the circuit breaker line phase electrical connection and the respective base pan line phase electrical connection are not in electrical contact with each other. In the second rotational position, the circuit breaker line neutral electrical connection establishes electrical contact with the respective base pan line neutral electrical connection. The circuit breaker load phase and load neutral electrical connections are in electrical contact with the respective base pan load phase and load neutral electrical connections. However, the circuit breaker line phase electrical connection and the respective base pan line phase electrical connection are not in electrical contact with each other. In the third rotational position, the circuit breaker line phase electrical connection establishes electrical contact with the respective base pan line phase electrical connection. In addition, the circuit breaker load phase and load neutral electrical connections are in electrical contact with the respective base pan load phase and load neutral electrical connections, and the circuit breaker line neutral electrical connection and the respective base pan line neutral electrical connection are in electrical contact with each other.

The base pan load phase and load neutral electrical connections can be positioned on a sidewall of the base pan, and the circuit breaker load phase and load neutral electrical connections can be positioned on an end surface of the circuit breaker housing.

The base pan load phase and load neutral electrical connections include respective wire connection portions, the wire connection portions being slidably received in correspondingly shaped recesses in the sidewall of the base pan such that the base pan load phase and load neutral electrical connections can be removably connectable to the base pan.

The pivot joint may comprise a recess (e.g., a hook member) on the circuit breaker housing and a protrusion (e.g., a corresponding rib) disposed on a surface of the base pan so that the circuit breaker is rotatably movable with respect to the base pan via engagement of the recess and protrusion.

The protrusion and recess may comprise a mechanical coupling (e.g., a snap-fit connection) that provides at least one of a tactile and an audible feedback when the circuit breaker is engaged with the base pan in the third rotational position.

One of the plurality of base pan electrical connections comprises a line neutral electrical connection having a triangular shape for minimizing an insertion force between the base pan line neutral electrical connection and a line neutral electrical connection of the circuit breaker.

The housing can include a protrusion on an end face thereof, and the base pan can include a recess on a sidewall thereof, the recess disposed between a load neutral electrical connection and a load phase electrical connection of the base pan, and wherein the protrusion can be receivable within the recess to provide a predetermined dielectric barrier between the load neutral electrical connection and the load phase electrical connection. The housing can further include an arcuate rib on a bottom surface of the housing and the base pan can comprise a correspondingly sized and shaped arcuate pad for slidably receiving the arcuate rib when the circuit breaker is rotated into engagement with the base pan.

A load center is disclosed. The load center may include a base pan having a plurality of circuit breaker spaces, each of the circuit breaker spaces being configured to receive a circuit breaker; and a plurality of base pan electrical connections disposed within each circuit breaker space, the plurality of base pan electrical connections including line phase, line neutral, load phase, and load neutral electrical connections. The base pan line phase, line neutral, load phase, and load neutral electrical connections are arranged and configured to mechanically and electrically contact respective line phase, line neutral, load phase, and load neutral electrical connections of the circuit breaker when the circuit breaker is received within the circuit breaker space.

Each of the base pan load phase and load neutral electrical connections of each of the circuit breaker spaces are electrically isolated from respective base pan load phase and load neutral connections of other circuit breaker spaces when the circuit breaker is not located within the circuit breaker space.

The load center may further include one or more line phase bus bars and one or more line neutral bus bars. The base pan line phase electrical connections may be electrically coupled to the line phase bus bars and the base pan line neutral electrical connections may be electrically coupled to the line neutral bus bars.

The load center may further include an auxiliary neutral bus bar configured to receive a neutral conductor of a dedicated branch circuit.

The base pan line phase and line neutral electrical connections may be male electrical connections. The male electrical connections may be selected from the group consisting of blades, pins, and prongs. The base pan line neutral electrical connection may have a triangular shape. The base pan line phase and line neutral electrical connections may be female electrical connections. The female electrical connections may be selected from the group consisting of clamping connectors, jaws, sockets, and sleeves.

Each of the circuit breaker spaces may be configured to rotationally receive the circuit breaker about an axis of the circuit breaker space. The base pan line phase, line neutral, load phase, and load neutral electrical connections within each circuit breaker space may be disposed within the circuit breaker spaces such that electrical contact with the respective circuit breaker electrical connections is made sequentially when the circuit breaker is rotationally received within the circuit breaker space.

The base pan load phase and load neutral connections may be arranged within each circuit breaker space such that electrical contact with the respective circuit breaker load phase and load neutral electrical connections is established before the circuit breaker line neutral connection establishes electrical contact with the respective base pan line neutral connection.

The base pan line neutral connections within each circuit breaker space may be arranged such that electrical contact with the respective circuit breaker line neutral electrical connection is established before the circuit breaker line phase connection establishes electrical contact with the respective base pan line phase connection.

The base pan load phase and load neutral electrical connections may be positioned on a sidewall of the base pan. The base pan load phase and load neutral electrical connections may include respective wire connection portions. The wire connection portions may be slidably received in correspondingly shaped recesses in the sidewall of the base pan such that the base pan load phase and load neutral electrical connections are removably connectable to the base pan.

The axis may include a protrusion disposed on a surface of the base pan such that the circuit breaker is rotatably movable with respect to the base pan via engagement of the circuit breaker and the protrusion. The protrusion may be a rib.

Each circuit breaker space may include a mechanical coupling that provides at least one of a tactile and an audible feedback when the circuit breaker is at least partially received within the circuit breaker space. The mechanical coupling may be a snap-fit connection.

The base pan may include a recess on a sidewall thereof, the recess may be disposed between the base pan load neutral and load phase electrical connections. A protrusion on an end of the circuit breaker may be received within the recess to provide a dielectric barrier between the base pan load neutral and load phase electrical connections when the circuit breaker is received within the circuit breaker space.

Each circuit breaker space may include an arcuate pad, the arcuate pad may be arranged and configured to slidably receive a corresponding arcuate rib located on a bottom surface of the circuit breaker when the circuit breaker is rotationally received within the circuit breaker space.

A circuit breaker is disclosed comprising: a housing having a longitudinal axis, top and bottom surfaces, and first and second ends, the housing can further comprise a plurality of electrical connections for coupling line and load electrical connections of a load center to the circuit breaker, the plurality of electrical connections including: a load phase electrical connection and a load neutral electrical connection disposed adjacent the second end of the housing; and a line neutral electrical connection and a line phase electrical connection disposed adjacent the bottom surface of the housing, the line phase electrical connection positioned adjacent the first end and the line neutral electrical connection disposed between the first and second ends; the housing further comprising one or more hook members disposed on the second end of the housing, the one or more hook members each having a hook axis oriented perpendicular to a longitudinal axis of the housing; wherein the one or more hook members are configured to engage one or more ribs of the load center so that the circuit breaker is rotatable about the hook axis to align and engage the plurality of circuit breaker electrical connections with a plurality of electrical connections associated with the load center.

First and second shoulders can be disposed on the bottom surface of the circuit breaker on opposite sides of the line phase electrical connection, the first and second shoulder configured to engage surfaces of the load center to lock the circuit breaker to the load center. A protrusion can be disposed on the second end of the housing, the protrusion disposed between the load phase electrical connection and a load neutral electrical connection, the protrusion providing a dielectric barrier between the load neutral electrical connection and the load phase electrical connection. First and second arcuate ribs can be disposed on the bottom surface of the housing, the first and second arcuate ribs configured to slidingly engage corresponding arcuate surfaces of the load center. The one or more hook members may include first and second hook members positioned above the load phase electrical connection and a load neutral electrical connection, respectively, on the second end of the housing.

A modular base pan for use in a load center is also disclosed. The base pan may include a plurality of line phase electrical connections, a plurality of line neutral electrical connections, a plurality of load neutral electrical connections, and a plurality of load phase electrical connections for electrically coupling to corresponding electrical connections of one or more circuit breakers positioned within the load center. The base pan may include a top pan portion and a bottom pan portion fastened together.

The modular base pan may also include one or more line phase bus bars and one or more line neutral bus bars positioned between the top and bottom pan portions. The one or more line phase bus bars may include the plurality of line phase electrical connections and the one or more line neutral bus bars may include the plurality of line neutral electrical connections.

The bottom pan portion may be arranged and configured to receive the one or more line phase bus bars and one or more line neutral bus bars so that the plurality of line phase electrical connections and the plurality of line neutral electrical connections are located in a predetermined position. The top pan portion may include a plurality of openings or apertures formed therein for receiving the plurality of line phase electrical connections and the plurality of line neutral electrical connections therein.

The top and bottom pan portions may include a plurality of interlocking protrusions and recesses so that the top pan portion can be snapped-fitted to the bottom pan portion. The bottom pan portion may include a plurality of protrusions extend upwardly therefrom on opposite first and second lateral sides for engaging a corresponding surface formed on the top pan portion, respectively.

The bottom pan portion may include one or more rows of protrusions extending upwardly therefrom, the one or more rows located between first and second lateral sides of the bottom pan portion. The top pan portion may include a plurality of openings or apertures for receiving the plurality of protrusions so that the plurality of protrusions can engage a corresponding surface formed on the top pan portion, respectively.

The top pan portion may include first and second top pan modules fastened together, and the bottom pan portion includes first and second bottom pan modules fastened together. The first and second bottom pan modules may include interlocking projections and recesses for securing the first and second bottom pan modules together. The interlocking projections and recesses may be located on first and second lateral sides of each bottom pan module. The first and second bottom pan modules may include overlapping sections so that one of the first and second bottom pan modules partially resides on the other of the first and second bottom pan modules.

A method for coupling a circuit breaker to a load center is disclosed. The method can include: engaging a hook member of a circuit breaker with a rib of a base pan of a load center; rotating the circuit breaker about the rib to achieve a first rotational position in which load phase and load neutral electrical connections of the circuit breaker establishes electrical contact with load phase and load neutral electrical connections of the base pan, respectively; rotating the circuit breaker about the rib to achieve a second rotational position in which a line neutral electrical connection of the circuit breaker establishes electrical contact with a line neutral electrical connection of the base pan; and rotating the circuit breaker about the rib to achieve a third rotational position in which a line phase electrical connection of the circuit breaker establishes electrical contact with a line phase electrical connection of the base pan.

The method may further include, when the circuit breaker is positioned in the third rotational position, engaging a mechanical coupling (e.g., a snap-fit connection) between the circuit breaker and the base pan to rotationally lock the circuit breaker to the base pan.

In the first rotational position, the circuit breaker load phase and load neutral electrical connections establish electrical contact with the base pan load phase and load neutral electrical connections, respectively, while the circuit breaker line neutral electrical connection and the base pan line neutral electrical connection are not in electrical contact with each other, and the circuit breaker line phase electrical connection and the base pan line phase electrical connection are not in electrical contact with each other. In the second rotational position, the circuit breaker line neutral electrical connection establishes electrical contact with the base pan line neutral electrical connection, and the circuit breaker load phase and load neutral electrical connections are in electrical contact with the base pan load phase and load neutral electrical connections, respectively, while the circuit breaker line phase electrical connection and the base pan line phase electrical connection are not in electrical contact with each other. In the third rotational position, the circuit breaker line phase electrical connection establishes electrical contact with the base pan line phase electrical connection, and the circuit breaker load phase and load neutral electrical connections are in electrical contact with the base pan load phase and load neutral electrical connections, respectively, and the circuit breaker line neutral electrical connections and the base pan line neutral electrical connections are in electrical contact with each other.

The step of rotating the circuit breaker about the rib to achieve a first rotational position includes receiving a projection of the circuit breaker within a recess of the base pan between the load phase and load neutral electrical connections of the base pan. The step of rotating the circuit breaker about the rib to achieve a first rotational position can include engaging first and second arcuate ribs disposed on a bottom surface of the circuit breaker with correspondingly arcuate shaped first and second pad members of the base pan. The step of rotating the circuit breaker about the rib to achieve a third rotational position includes engaging first and second supports of the base pad with a load phase opening and a load neutral opening, respectively, of the circuit breaker.

A load center is disclosed, comprising: a base pan having a longitudinal axis, the base pan including a top pan portion, and a bottom pan portion, and a plurality of bus bars sandwiched between the top pan portion and the bottom pan portion, each of the plurality of bus bars comprising: a flat bar portion having a longitudinal axis oriented parallel to the longitudinal axis of the base pan, a plurality of electrical connection extension portions that extend perpendicular to the longitudinal axis of the respective bus bar; wherein each of the plurality of electrical connection extension portions end in a respective electrical connection.

The plurality of electrical connection extension portions may lie in a same plane as the flat bar portion of the associated bus bar.

The plurality of bus bars can comprise first and second line phase bus bars and first and second line neutral bus bars. In use, the first and second line neutral bus bars may be electrically coupled while the first and second line phase bus bars are electrically separated (e.g., not electrically coupled).

The top and bottom pan portions can comprise a mechanical coupling (e.g., a snap engagement feature) to couple the top pan portion to the bottom pan portion.

The electrical connection of each electrical connection extension portion can be oriented perpendicular to the plane of the electrical connection extension portion. The top pan portion can include a plurality of openings for receiving the respective electrical connections of the plurality of electrical connection extension portions therethrough. At least some of the electrical connections can comprise line neutral electrical connections, the line neutral electrical connections may include a triangular shape to reduce insertion force during engagement of the line neutral electrical connections with opposing line neutral electrical connections of a circuit breaker.

The bottom pan portion can comprise first and second pedestal members for supporting load phase and load neutral electrical connections of the base pan, the top pan portion comprising recesses into which wire engagement portions of the load phase and load neutral electrical connections are received and retained.

The top pan portion can comprise a plurality of top pan modules and the bottom pan portion can further comprise a plurality of bottom pan modules, wherein the bottom pan modules each have a barbed projection at one end and a recess at an opposite end, the barbed projection and the recess provided on a corresponding lateral side of the bottom pan module, wherein the barbed projection of a first of the plurality of bottom pan modules is receivable in the recess of a second of the plurality of bottom pan modules to fix the first and second bottom pan modules together. Each of the plurality of bottom pan modules may be configured to accommodate a predetermined number of the plurality of electrical connection extension portions.

BRIEF DESCRIPTION OF THE DRAWINGS

By way of example, a specific embodiment of the disclosed device will now be described, with reference to the accompanying drawings, in which:

FIG. 27 is a cross-sectional view of the electrical connection (e.g., terminal block) shown in FIG. 26 coupled to a pedestal member; and FIG. 28 is a top view of the electrical connection (e.g., terminal block) shown in FIG. 26 coupled to a pedestal member.

DETAILED DESCRIPTION

The following disclosure is intended to provide exemplary embodiments of the disclosed system and method, and these exemplary embodiments should not be interpreted as limiting. One of ordinary skill in the art will understand that the steps and methods disclosed may easily be reordered and manipulated into many configurations, provided they are not mutually exclusive. As used herein, "a" and "an" may refer to a single or plurality of items and should not be interpreted as exclusively singular unless explicitly stated.

A circuit breaker and panel arrangement are disclosed which utilize mechanical connectors for all input and output electrical connections. The concept allows the panel to be fully wired without the circuit breakers being installed. The circuit breakers can then be engaged with and retained by the panel via mechanical connections such that the electrical connections do not need to be relied on for breaker stability or retention. A snap-fit feature between the circuit breakers and the panel provides audible and/or tactile feedback when each circuit breaker is fully engaged with the panel. The disclosed arrangement also includes features in the panel and circuit breaker structure that form integral barriers to create desired spacing (e.g., over the surface spacing) between load phase and load neutral connections of the breaker and/or panel structure. As will be appreciated, such barriers may be desirable to prevent arcing between load phase and load neutral connections.

The disclosed arrangement may also include an installation feature in which the circuit breakers can be pivotably coupled to the panel and rotated into engagement with the electrical connections of the panel. This pivotable connection can be employed to ensure a desired coupling sequence between the electrical connections. For example, the electrical connections of the circuit breaker and the panel can be arranged so that as the breaker is rotated into engagement with the panel, the breaker makes contact first with the load phase and load neutral electrical connections, then with the line neutral electrical connection, and finally with the line phase electrical connections. As will be appreciated this arrangement can prevent an installer from installing a breaker incorrectly.

Figure 1:
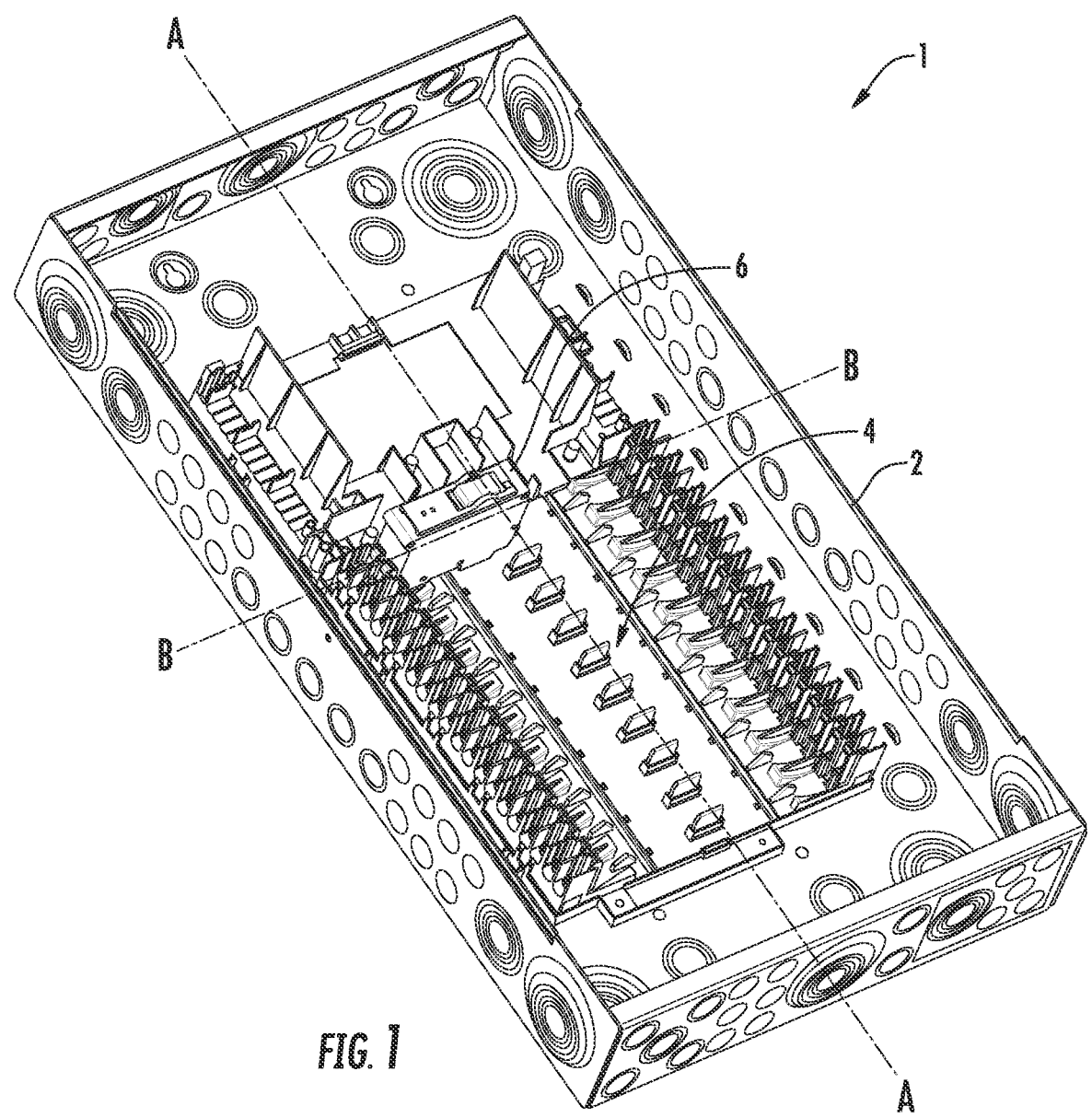
FIG. 1 is an isometric view of an exemplary circuit breaker and load center system according to the disclosure.

Referring now to FIG. 1, an exemplary circuit breaker and load center system 1 according to the present disclosure is shown. The system 1 may include a panel 2 configured to house a base pan 4 and a plurality of circuit breakers 6 removably coupled to the base pan. In use, the base pan 4 and the plurality of circuit breakers 6 may include interconnecting electrical connections which may be in any form including, for example, blade terminals, screw terminals, bus bars, posts, electrical connectors, stabs, etc. For example, in one embodiment, the base pan 4 and the plurality of circuit breakers 6 may include interconnecting male and female electrical connections. The male connections may be in the form of, for example, blades, pins, prongs, etc. and the female connections may be in the form of, for example, clamping connectors, jaws, sockets, sleeves, etc. As used herein, the interconnecting electrical connections will be referred to as "electrical connection" without the intent to limit.

The panel 2 may form a generally rectangular enclosure within which the base pan 4 and circuit breaker 6 are contained. The panel 2 and base pan 4 may both have a longitudinal axis A-A which a plurality of circuit breakers 6 may be adjacent thereto. The circuit breaker 6 may have a longitudinal axis B-B, which in the illustrated embodiment is perpendicular to the longitudinal axis A-A of the panel 2, when the circuit breakers 6 are installed.

A cover and door may be provided for the panel, but for purposes of clarity these have not been shown. As will be appreciated, the circuit breaker and load center system 1 may include other elements such as a main breaker, auxiliary buses, wiring connections and the like. For the purposes of the disclosure, however, such elements are not shown. In addition, although the description will proceed in relation to a single circuit breaker 6 and the manner of its mechanical and electrical engagement, in a corresponding circuit breaker space, with the base pan 4 and panel 2, it will be appreciated that the base pan and panel can be configured to receive a plurality of circuit breakers in a similar fashion. For example, as shown, the base pan 4 and panel 2 may be configured as a twenty-circuit panel (e.g., capable of receiving up to 20 circuit breakers). It is envisioned that the base pan 4 and panel 2 may be configured to receive any number of circuit breakers.

Figure 2:
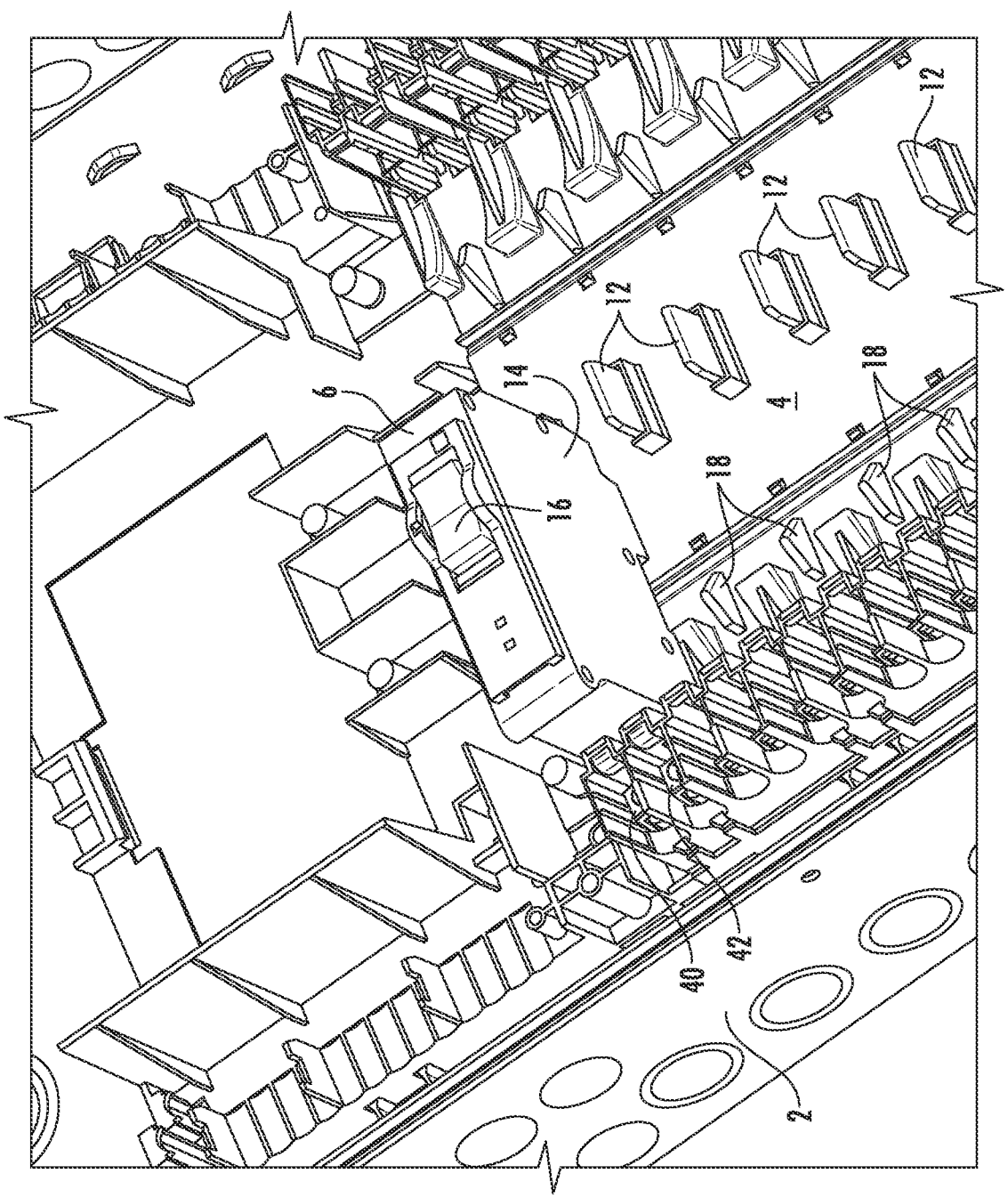
FIG. 2 is a detail view of a portion of the system of FIG. 1.
Figure 3:
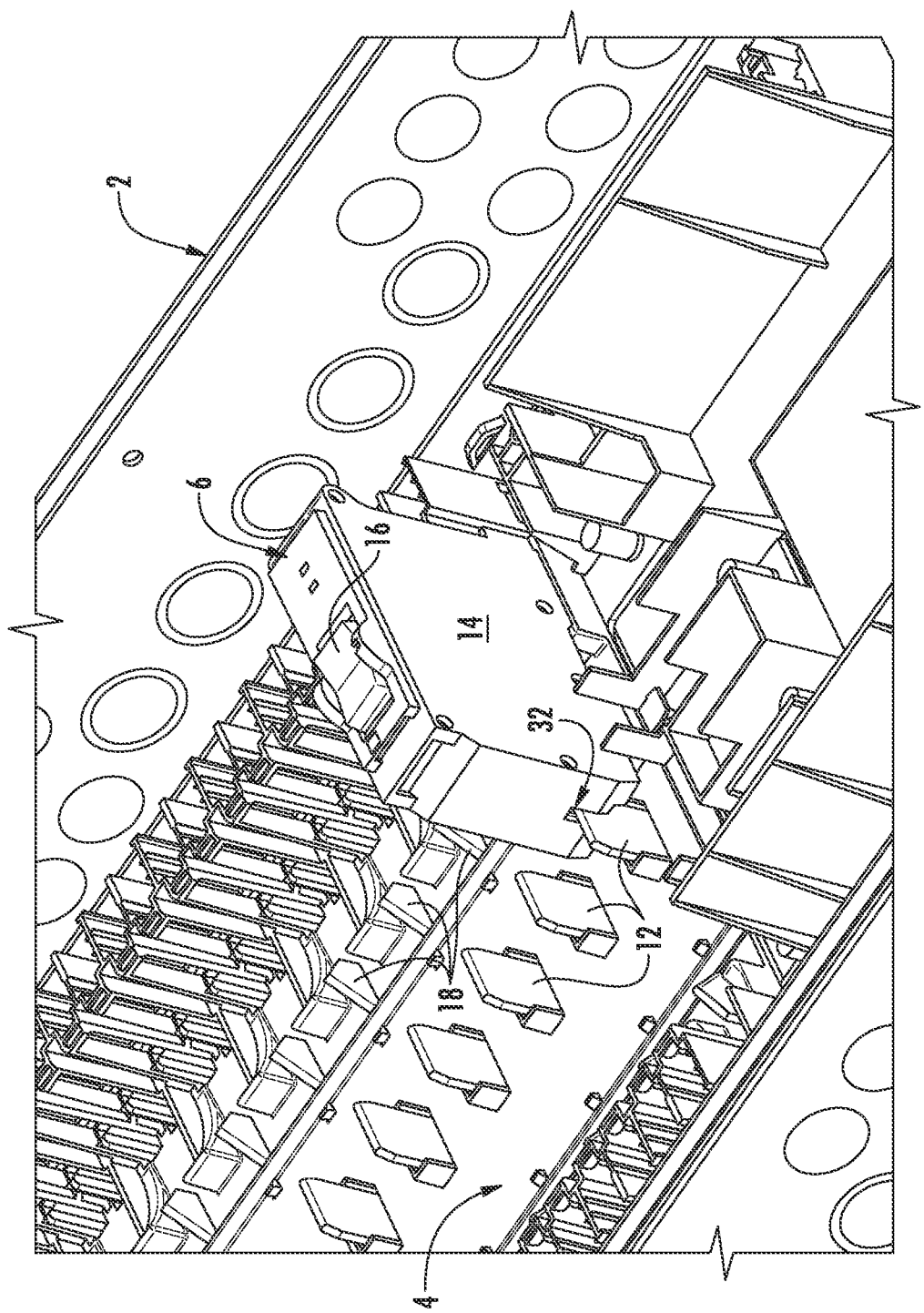
FIG. 3 is another detail view of a portion of the system of FIG. 1.

FIGS. 2 and 3 show the circuit breaker 6 coupled to surface features of the base pan 4 in a manner that aligns electrically conductive electrical connections of the circuit breaker with corresponding electrically conductive electrical connections of the base pan 4. In the illustrated embodiment, the circuit breaker 6 may be received by the base pan 4 such that load phase, load neutral, line phase and line neutral electrical connections of the base pan align and are engageable with corresponding electrical connections of the circuit breaker. It should be noted that the line phase and line neutral electrical connections of the base pan may also be commonly referred to as a bus bar. In the present disclosure, the line phase and line neutral shall be referred to as electrical connections throughout without the intent to limit and the line phase and line neutral may be in the form of terminals, screw terminals, bus bars, posts, etc.

Coupling the conductive electrical connection of the circuit breaker 6 to the load phase, load neutral, and line phase electrical connections 40, 42, 12, of the base pan 4 are shown. The connection between the line neutral electrical connections of the base pan 4 and circuit breaker 6 is made underneath the circuit breaker 6 by a line neutral electrical connection 18.

The circuit breaker 6 may comprise a housing 14 within which can be mounted current carrying components, current sensing components, and a tripping and operating mechanism. An actuator 16, may be coupled to the tripping and operating mechanism to operate and/or trip/reset the circuit breaker 6. As illustrated, the actuator 16 may be in the form of a rocker switch, however it is envisioned that any form of suitable actuator may be incorporated. The current carrying components may include one or more electrical connections, as will be described in greater detail later. The current sensing components and the tripping and operating mechanism may be any appropriate sensing, tripping and operating mechanism known in the art.

As can be seen in FIGS. 2 and 3, the base pan 4 may include a plurality of line phase electrical connections 12 and line neutral electrical connections 18 spaced apart along a line parallel to the longitudinal axis A-A of the panel 2. The number of such line phase and line neutral electrical connections 12, 18 may be selected to accommodate a predetermined plurality of circuit breakers 6 within the panel 2. As previously mentioned, the circuit breaker and load center system 1 may be configured as a twenty-circuit panel, a thirty-circuit panel, a forty-two-circuit breaker panel, etc. As can be seen, the circuit breaker 6 is coupled to the base pan 4 so that a longitudinal axis B-B of the breaker is oriented perpendicular to the longitudinal axis A-A of the panel 2.

The circuit breaker 6 may be any appropriate type of circuit breaker now known or hereafter developed. For example, the circuit breaker 6 may be, for example, a residential circuit breaker or a commercial circuit breaker, as will be appreciated by those of ordinary skill in the art. Moreover, the circuit breaker 6 may be a single pole, double pole, triple pole, duplex/tandem, triplex (2 pole common trip combined with two independent single poles), quadplex (two 2 pole common trip breakers, etc.) circuit breaker. In addition, circuit breaker 6 may be provided in any number of amperages. For example, the plug on circuit breaker may be provided in any amperage up to the limitations of the lug installed in the panel 2. Thus, in some embodiments the disclosed panel 2 can accommodate circuit breakers 6 with amperages above these limitations by utilizing internal lugs for direct connection. As such, the circuit breaker and load center system 1 can accommodate both plug on and internal lugs type circuit breakers 6. The disclosed panel 2 may also accommodate circuit breakers with various types of interrupting mechanisms. Non-limiting examples of such types of interrupting mechanisms are: thermal (e.g. bi-metallic element), magnetic (e.g. solenoid driven), hydraulic-magnetic (e.g. solenoid to drive a plunger inside a cylinder of dampening fluid), thermal magnetic, or any suitable combination thereof. Likewise, the disclosed panel 2 may accommodate circuit breakers providing various types of protection. Non-limiting examples of such types of protection are: overcurrent, GFCI, AFCI, GFCI & AFCI, GFPE, surge, or any suitable combinations thereof. Additionally, such circuit breakers may include any suitable sensing elements and/or circuitry such as but not limited to: current transformers, differential current sensors, grounded-neutral detection, high frequency detection, or any suitable combination thereof.

Referring now to FIGS. 4-9, an exemplary circuit breaker 6 according to the disclosure will be described in greater detail. The circuit breaker 6 may include a housing 14 having first and second sides 20, 22, first and second ends 24, 26, a top surface 28 and a bottom surface 30. In the illustrated embodiment, the circuit breaker 6 may include features configured to engage surfaces of the base pan 4 so that the first end 24 of the housing is positioned directly adjacent the axis A-A of the panel 2, and the second end 26 of the housing engages a sidewall portion of the base pan 4.

The top surface 28 of the circuit breaker housing 14 may include the switch actuator 16, positioned at a location easily accessible by a user. The bottom surface 30 of the housing may include surface features that cooperate with corresponding features of the base pan 4 to guide the circuit breaker 6 into a desired alignment with the base pan 4 so that the electrical connections of the circuit breaker 6 engage the electrical connections of the base pan 4 in a desired manner and sequence, as will be described in greater detail later.

Figure 4:
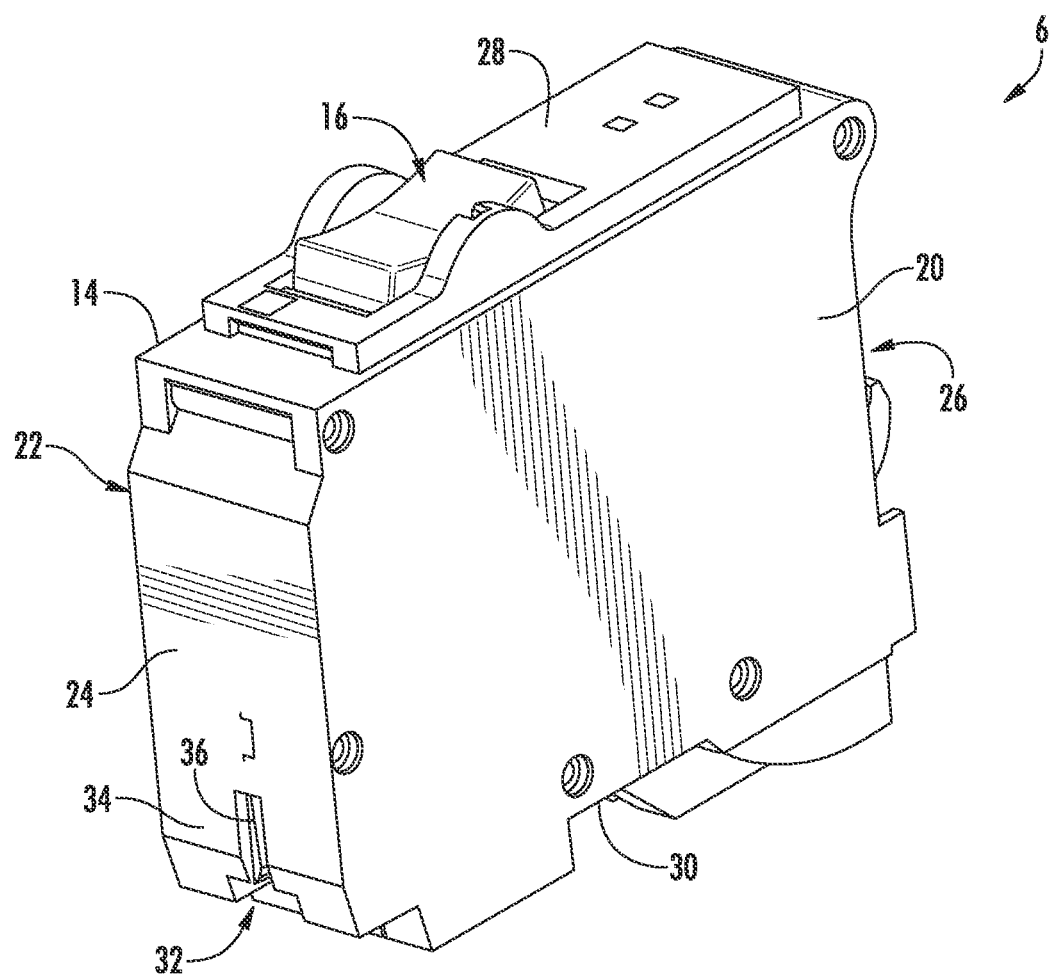
FIG. 4 is a front, isometric view of an exemplary circuit breaker of the system of FIG. 1.

The circuit breaker 6 may include a plurality of openings configured to receive the different electrical connections of the base pan 4. FIG. 4 illustrates a line phase electrical connection opening 32 disposed in a bottom portion 34 of the first end 24 of the housing 14. The line phase electrical connection opening 32 may extend between the bottom portion 34 of the first end 24 and the bottom surface 30 directly adjacent to the first end 24 so that a portion of one of the line phase electrical connections 12 of the base pan 4 can be received through the bottom surface and first end. This can best be seen in FIG. 3 in which a portion of one of the line phase electrical connections 12 is engaged with, and has a portion extending away from, the first end 24 of the installed circuit breaker 6. As will be appreciated such a design enables two adjacent circuit breakers 6 to be engaged in an opposite direction with a single line phase electrical connection 12 of the base pan 4.

Figure 7:
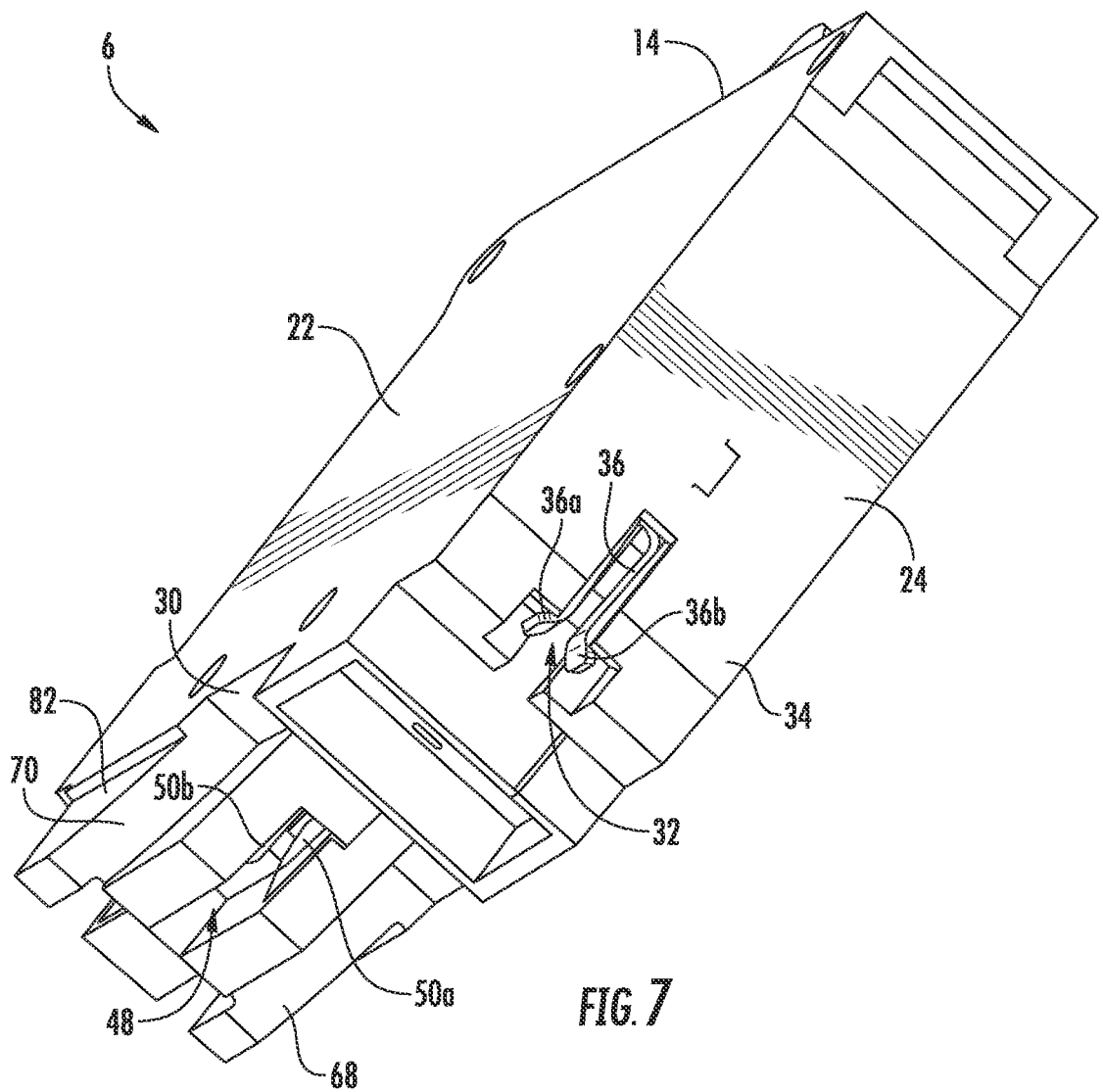
FIG. 7 is a bottom, front isometric view of the exemplary circuit breaker of FIG. 4.
Figure 8:
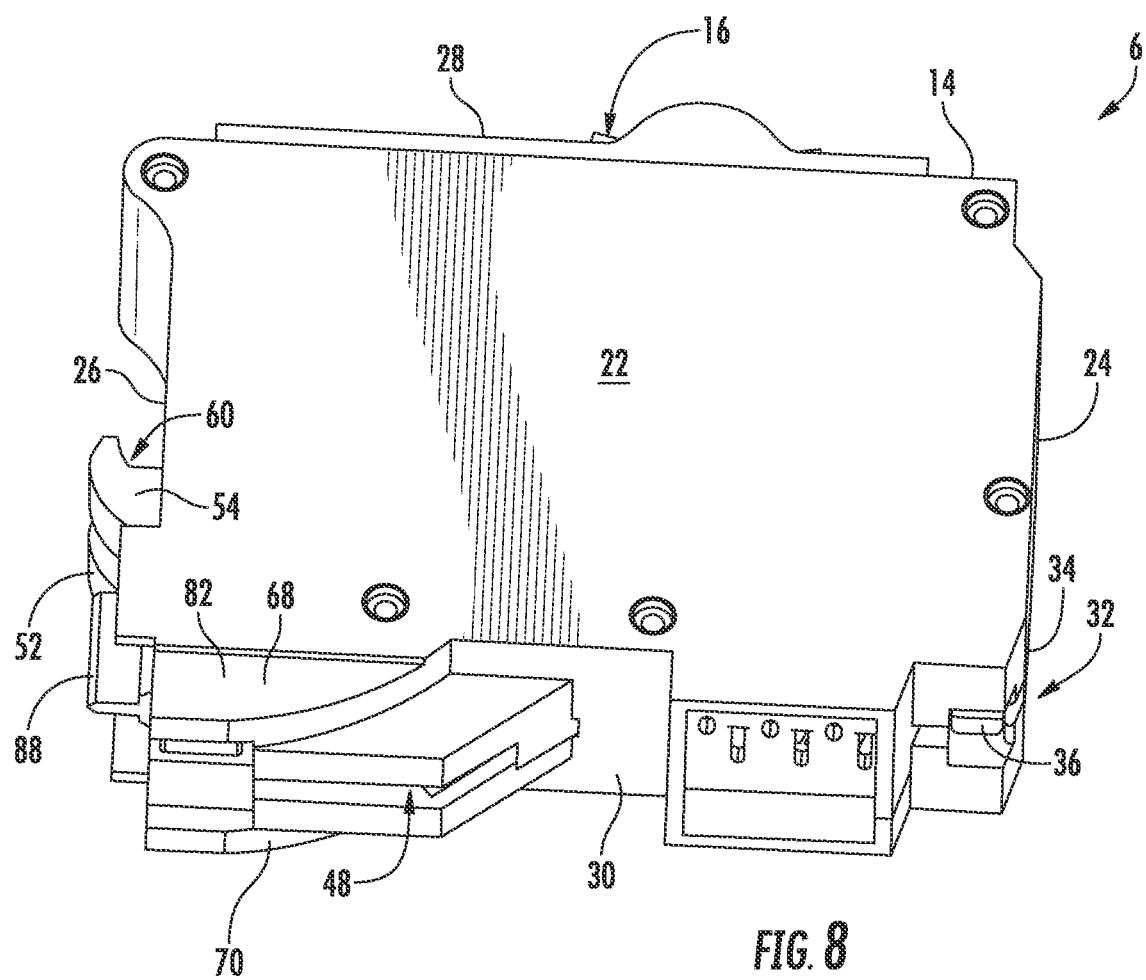
FIG. 8 is a bottom, side isometric view of the exemplary circuit breaker of FIG. 4.
Figure 9:
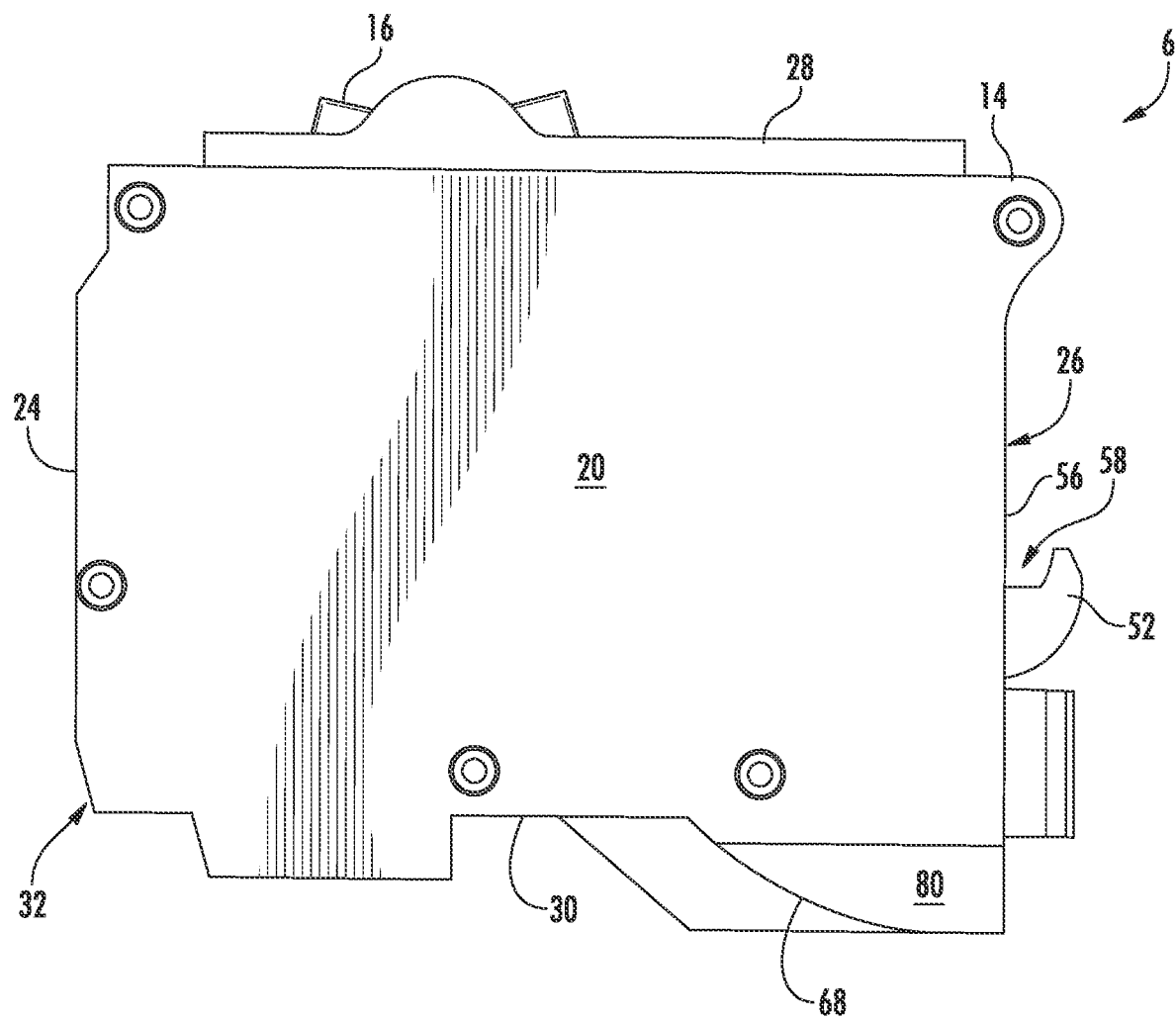
FIG. 9 is a side view of the exemplary circuit breaker of FIG. 4.

A circuit breaker line phase electrical connection 36 can be disposed within the line phase electrical connection opening 32 so that it can electrically contact one of the line phase electrical connections 12 of the base pan 4. In the illustrated embodiment, the circuit breaker line phase electrical connection 36 may be in the form of a U-shaped clip element having first and second spring arms 36a, 36b positioned in opposing relation to each other, and separated by a distance that is smaller than a thickness of the line phase electrical connection 12 of the base pan 4. Thus, when the circuit breaker 6 is properly positioned within the base pan 4 (as will be described in greater detail below), one of the line phase electrical connections 12 of the base pan 4 can be received between the first and second spring arms 36a, 36b (FIG. 7). The spring arms 36a, 36b of the circuit breaker line phase electrical connection 36 may clamp against the line electrical connection 12 of the base pan 4, enhancing contact to ensure a desired mechanical and electrical connection is securely made between the electrical connections.

Figure 5:
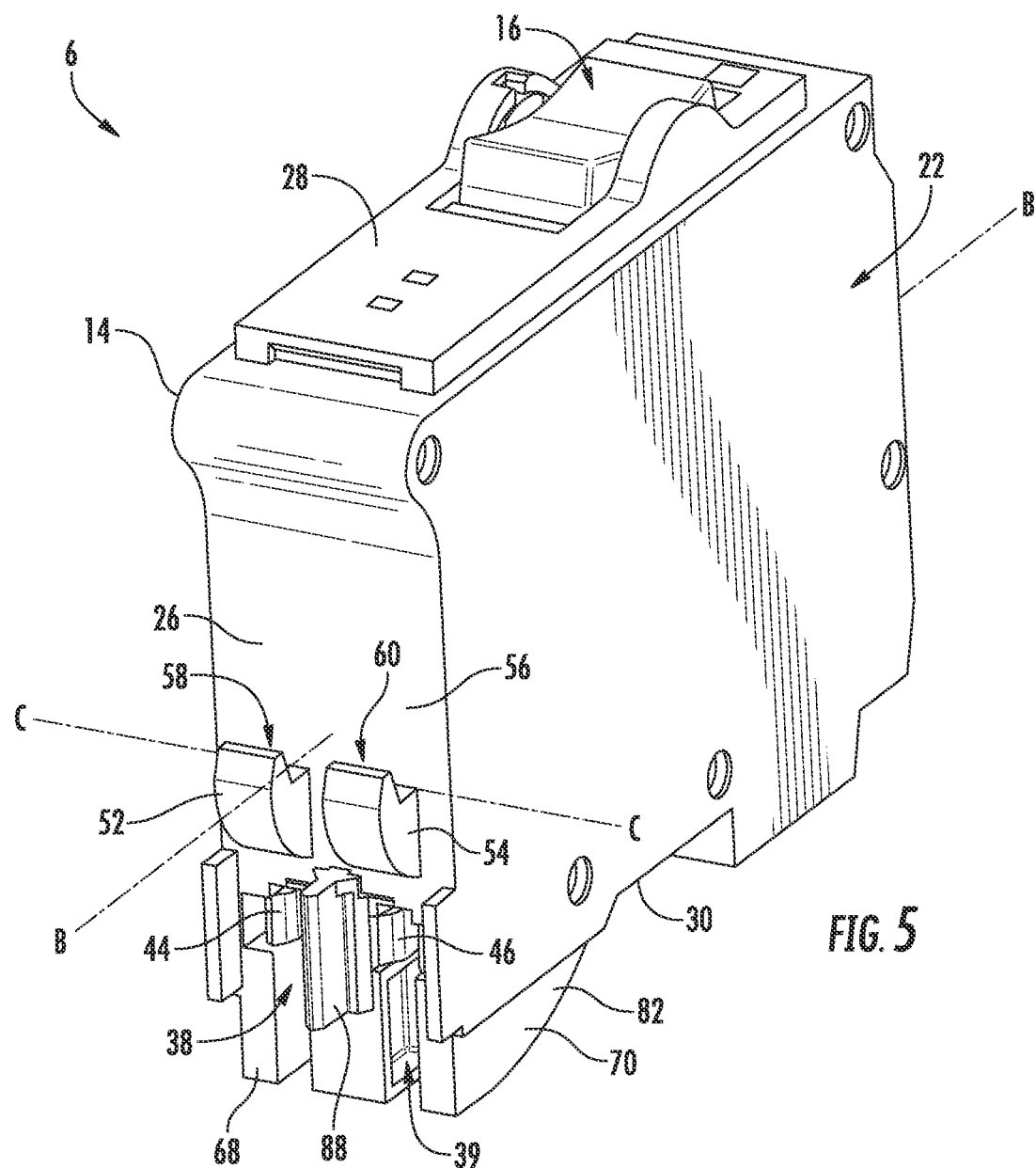
FIG. 5 is a rear, isometric view of the exemplary circuit breaker of FIG. 4.

Referring to FIG. 5, a load phase electrical connection opening 38 and a load neutral electrical connection opening 39 may be disposed in a second end 26 of the housing 14 so that respective load phase and load neutral electrical connection 40, 42 (see FIG. 10) of the base pan 4 can be received directly through the second end 26 of the housing 14. A circuit breaker load phase electrical connection 44 can be disposed within load phase electrical connection opening 38, and a circuit breaker load neutral electrical connection 46 can be disposed within load neutral electrical connection opening 39, so that the electrical connections 44, 46 can electrically contact the respective load phase and load neutral electrical connections 40, 42 of the base pan 4.

In the illustrated embodiment, the circuit breaker load phase electrical connection 44 and the load neutral electrical connection 46 each may be in the form of a U-shaped clip element having first and second spring arms 44a, 44b, 46a, 46b positioned in opposing relation to each other, and separated by a distance that is smaller than a thickness of the load phase electrical connection and the load neutral electrical connection 40, 42, respectively, of the base pan 4. Thus arranged, when the circuit breaker 6 is aligned with the base pan 4, a pair of load phase and load neutral electrical connections 40, 42 of the base pan 4 can be received between the first and second spring arms 44a, 44b, 46a, 46b (see FIG. 14). The spring arms 44a, 44b, 46a, 46b of the circuit breaker load phase and load neutral electrical connections 44, 46 may clamp against the load phase and load neutral electrical connection 40, 42 of the base pan 4, enhancing contact to ensure a desired mechanical and electrical connection is made between the electrical connections.

Figure 6:
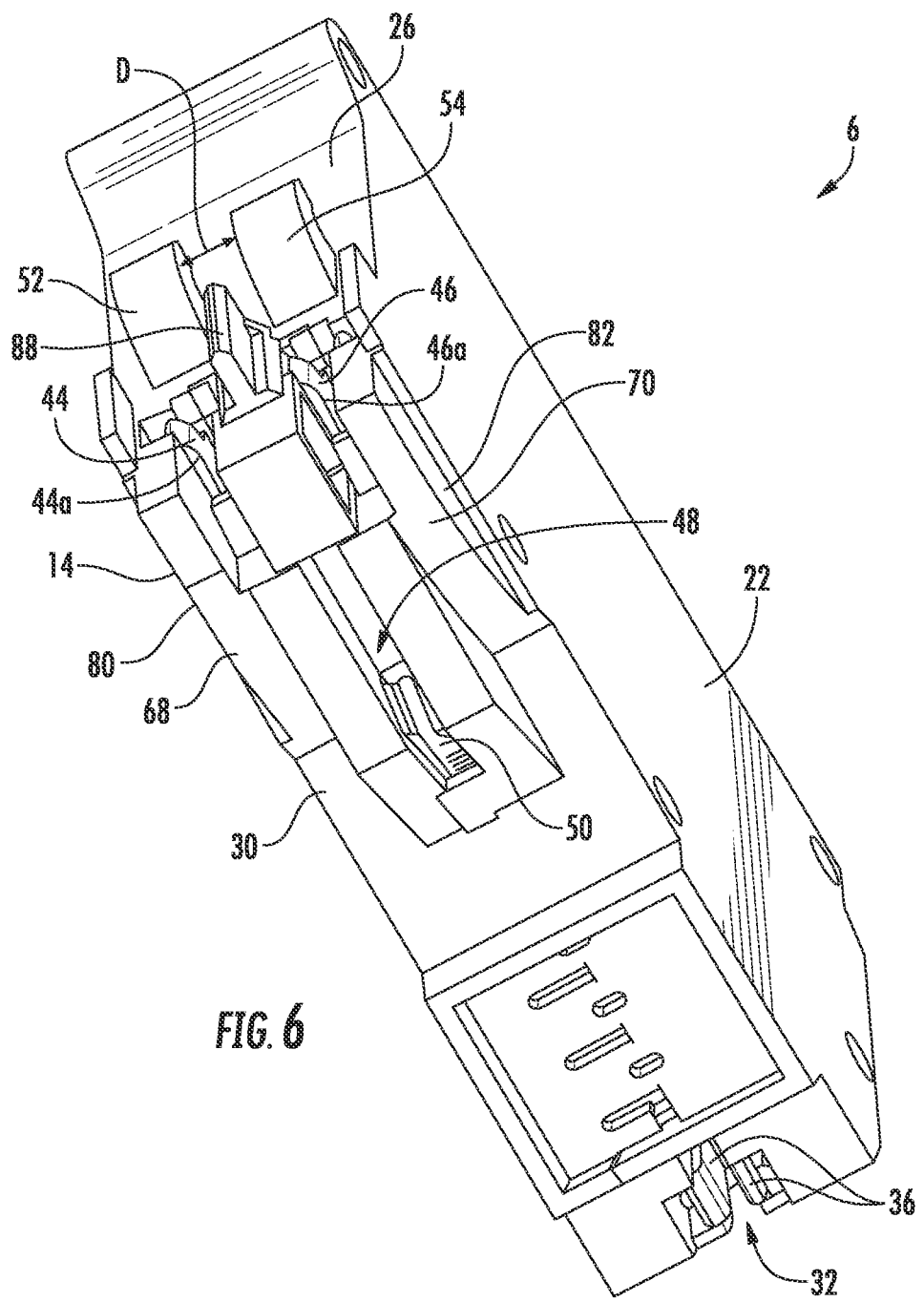
FIG. 6 is a bottom, rear, isometric view of the exemplary circuit breaker of FIG. 4.

FIG. 6 illustrates a line neutral electrical connection opening 48 disposed in the bottom surface 30 of the housing 14 so that a portion of one of the line neutral electrical connections 18 of the base pan 4 can be received through the bottom surface 30. A circuit breaker line neutral electrical connection 50 can be disposed within the line neutral electrical connection opening 48 so that it can mechanically and electrically contact a line neutral electrical connection 18 of the base pan 4. In the illustrated embodiment, the circuit breaker line neutral electrical connection 50 may be in the form of a U-shaped clip element having first and second spring arms 50a, 50b positioned in opposing relation to each other, and separated by a distance that is smaller than a thickness of the line neutral electrical connection 18 of the base pan 4. Thus arranged, when the circuit breaker 6 is aligned with the base pan 4, one of the line neutral electrical connections 18 of the base pan 4 can be received between the first and second spring arms 50a, 50b. The spring arms 50a, 50b of the circuit breaker line neutral electrical connection 50 may clamp against the line neutral electrical connection 18 of the base pan 4, enhancing contact to ensure a desired mechanical and electrical connection is made between the electrical connections.

As will be appreciated, the line phase, line neutral, load phase and load neutral electrical connections 36, 50, 44, 46 of the circuit breaker 6 may all be electrically coupled directly or indirectly to the current sensing components and the tripping and operating mechanism disposed within the housing 14 so that the circuit breaker 6 can operate to interrupt if an overcurrent, or other fault, condition is sensed by the sensing components, thus protecting one or more electrical loads receiving power via the panel 2.

As mentioned, the base pan 4 and circuit breaker 6 may have one or more surface features that cooperate to align the circuit breaker 6 with the base pan 4 so that one or more electrical connections 36, 50, 44, 46 of the circuit breaker 6 electrically contact with one or more electrical connections 12, 18, 40, 42 of the base pan 4 in a desired fashion. As will be discussed in greater detail later, the surface features of the base pan 4 and circuit breaker 6 may also serve to mechanically couple the circuit breaker 6 to the base pan 4 so that the electrical connections are not required to perform a mechanical retaining or coupling function. Further, the surfaces features of the base pan 4 and circuit breaker 6 can be arranged to provide a desired sequence of connections between the electrical connections 36, 50, 44, 46 of the circuit breaker 6 and the electrical connections 12, 18, 40, 42 of the base pan 4.

In some embodiments, the circuit breaker 6 and base pan 4 may have features that enable the circuit breaker to pivotably engage the base pan 4 so that the circuit breaker 6 can be "swung" into engagement with the base pan 4 and its terminals 12, 18, 40, 42. For example, as shown in FIG. 5, the housing 14 of the circuit breaker 6 may include first and second hook members 52, 54 disposed in a central region 56 of the second end 26. In the orientation shown in FIG. 5, the first hook member 52 is positioned above the load phase electrical connection 44 of the circuit breaker 6 while the second hook member 54 is positioned above the load neutral electrical connection 46 of the circuit breaker 6. As illustrated, the first and second hook members 52, 54 can be discrete hook elements spaced laterally apart by a distance "D" (see FIG. 6). Alternatively, the first and second hook members 52, 54 could be replaced by a single hook member, more than two hook members (e.g., three hook members), or alternate engagement features having a different shape entirely. Thus, it will be appreciated that although the illustrated embodiment includes first and second hook members 52, 54, other mechanical engagement arrangements can be used in lieu of hooks.

The first and second hook members 52, 54 may be oriented so that they form respective first and second hook recesses 58, 60 that open toward the top surface 28 of the housing 14. The first and second hook members 52, 54 may further be oriented such that the first and second hook recesses 58, 60 define a hook recess axis C-C that is oriented perpendicular to the longitudinal axis B-B of the circuit breaker 6. As will be described in greater detail later, the arrangement of the first and second hook members 52, 54 may allow the circuit breaker 6 to be hooked onto respective first and second ribs 62, 64 (FIGS. 10 and 11) disposed on a sidewall portion 66 of the base pan 4 so that the circuit breaker 6 can pivot into engagement with the base pan 4.

To further aid in aligning the circuit breaker 6 to the base pan 4, the housing 14 of the circuit breaker 6 may include first and second arcuate ribs 68, 70 disposed on the bottom surface 30 of the housing 14 adjacent the second end 26. The first and second arcuate ribs 68, 70 may be sized and shaped to contact corresponding arcuate support surfaces 72, 74 (FIGS. 10 and 11) of the base pan 4. As such, when the first and second hook members 52, 54 of the circuit breaker 6 are engaged with the first and second ribs 62, 64 of the base pan 4 and the circuit breaker 6 is rotated in a first direction with respect to the base pan 4, the first and second arcuate ribs 68, 70 of the circuit breaker 6 may slide along the first and second arcuate support surfaces 72, 74 of the base pan 4.

Figure 10:
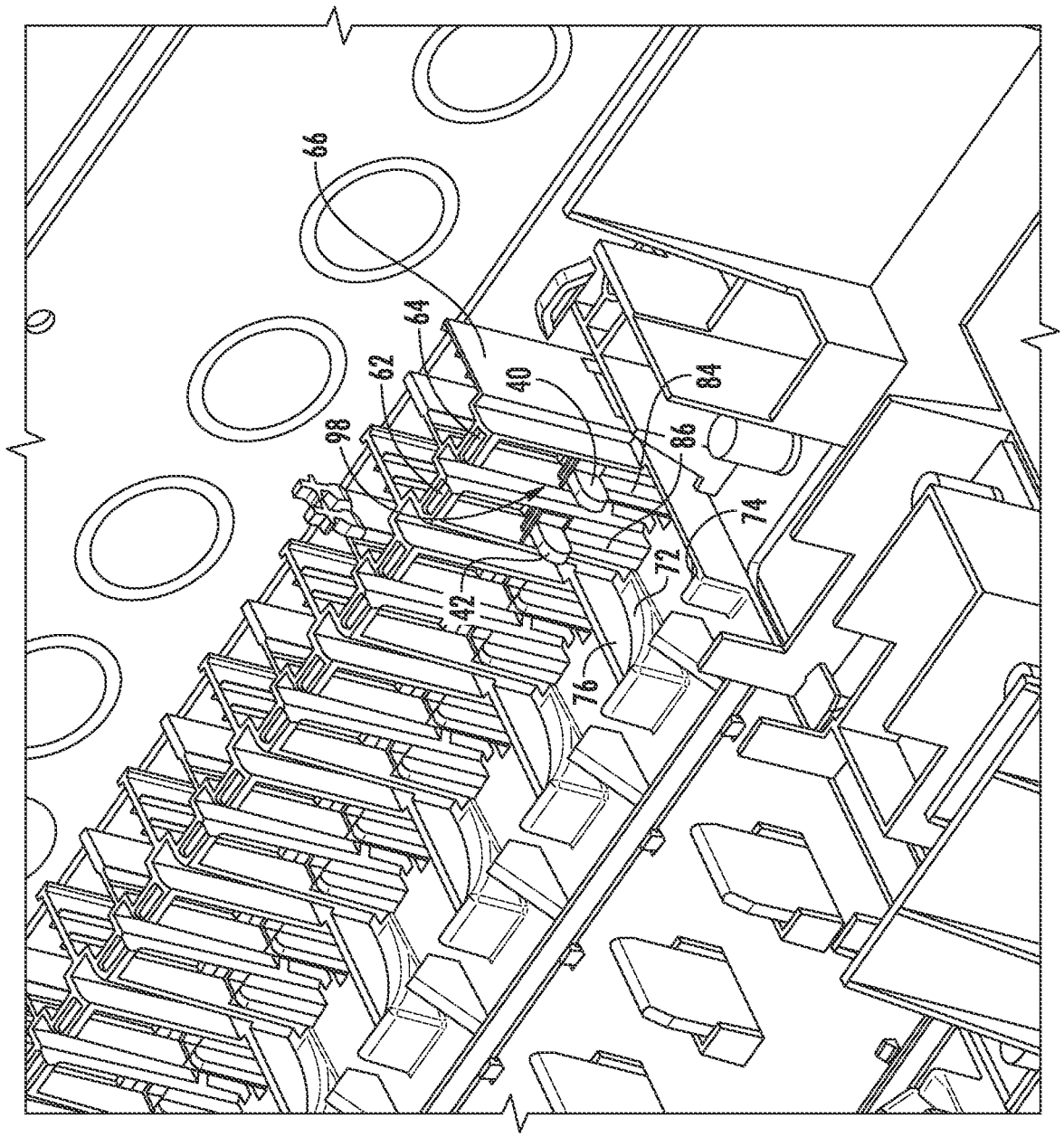
FIG. 10 is a detail view of a base pan portion of the system of FIG. 1.
Figure 11:
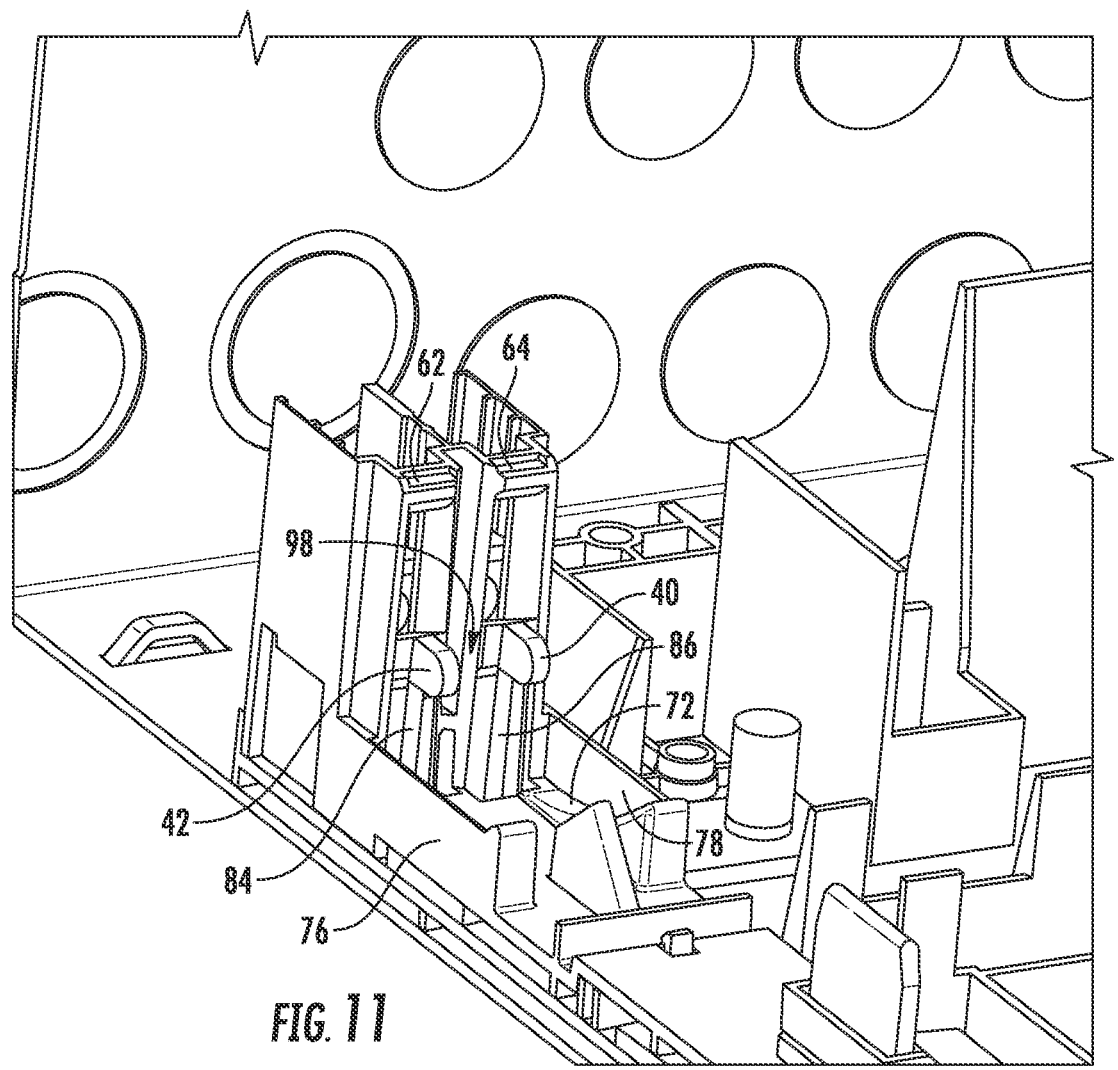
FIG. 11 is a detail view of exemplary electrical connections of the base pan portion of FIG. 10 for a single circuit breaker.

As mentioned, it may be desirable to confine the movement range of the circuit breaker 6 when it engages the base pan 4. It may also be desirable to firmly support the circuit breaker 6 once it is fully engaged with the base pan 4. Thus, as shown in FIGS. 10 and 11, the base pan 4 may include additional guiding features to ensure that a desired alignment and engagement between respective electrical connections of the circuit breaker 6 and base pan 4 is achieved. In some embodiments, each of the arcuate support surfaces 72, 74 of the base pan 4 may have a sidewall 76, 78 configured to engage respective side surfaces 80, 82 of the first and second arcuate ribs 68, 70 of the housing 14. Thus, as the circuit breaker 6 is rotated into engagement with the base pan 4, the sidewalls 76, 78 of the base pan 4 may engage and confine the side surfaces 80, 82 of the circuit breaker 6 therebetween to prevent movement of the circuit breaker 6 in the direction of the longitudinal axis A-A of the panel 2.

To provide additional stability, the base pan 4 may further include first and second lateral supports 84, 86 positioned on the sidewall portion 66 of the base pan 4 just below the load phase electrical connection 40 and the line load neutral electrical connection 42. The first and second lateral supports 84, 86 may be positioned and configured to be at least partially received within the load phase electrical connection opening 38 and the load neutral electrical connection opening 39 in the second end 26 of the housing 14 when the circuit breaker 6 is fully engaged with the base pan 4. As will be appreciated, when the first and second lateral supports 84, 86 are received within the load phase and load neutral electrical connection openings 38, 39 of the housing 14, the first and second lateral supports 84, 86 may prevent movement of the second end 26 of the circuit breaker in a direction parallel to the longitudinal axis A-A of the panel 2.

Once the circuit breaker 6 has been rotated into full engagement with the base pan 4, it may be desirable to positively retain the circuit breaker 6 in the fully engaged position so that its electrical connections with the base pan 4 are not compromised. Thus, the circuit breaker 6 and base pan 4 may have additional complementary features that provide for mechanical coupling of the breaker 6 to the base pan 4. In some embodiments, this coupling may be provided by a snap-fit connection between the circuit breaker 6 and the base pan 4.

Figure 12:
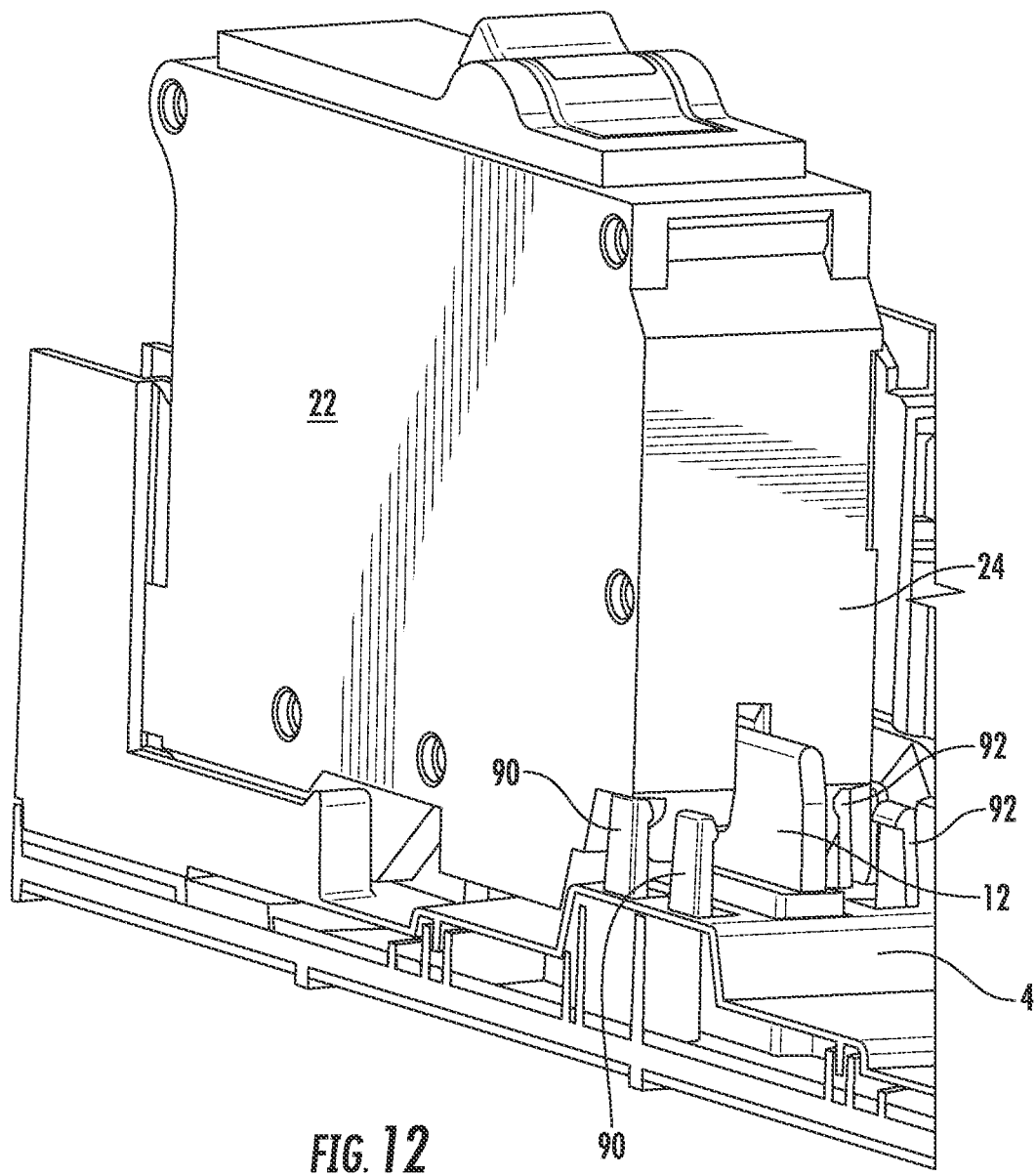
FIG. 12 is an isometric view of a snap-fit engagement connection between the circuit breaker and base pan portion of FIG. 1.
Figure 13:
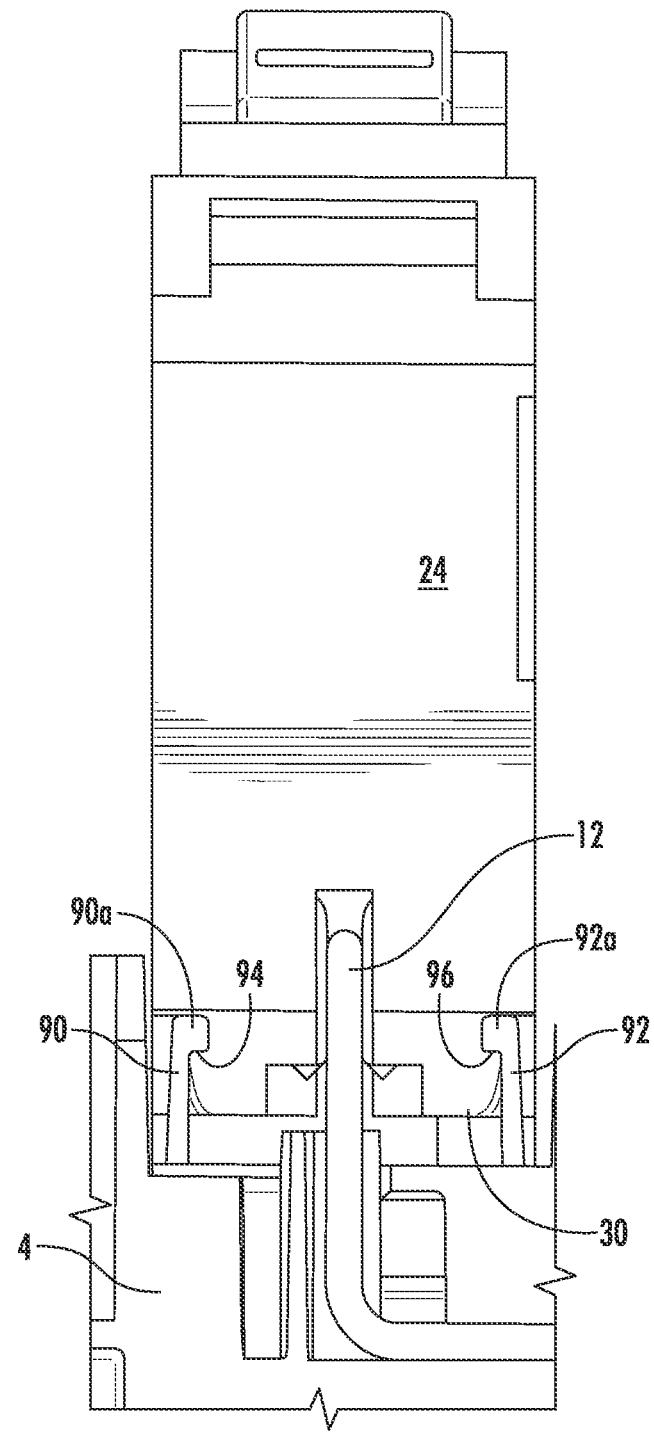
FIG. 13 is an end view of snap-fit engagement connection shown in FIG. 12.

FIGS. 12 and 13 show an exemplary snap-fit engagement feature for the circuit breaker 6 and base pan 4. In the illustrated embodiment, the base pan 4 can include first and second protrusions 90, 92 that extend outwardly from the base pan 4 on opposite sides of each line phase electrical connection 12 of the base pan 4. The first and second protrusions 90, 92 may extend toward the circuit breaker 6 and may be engageable with respective shoulders 94, 96 on the bottom surface 30 of the housing 14 of the circuit breaker 6 when the circuit breaker 6 is engaged with the base pan 4. In the illustrated embodiment, the shoulders 94, 96 are disposed on the bottom surface 30 of the housing 14 directly adjacent the first end 24 of the housing 14 so that they lie on opposite sides of the line phase electrical connection opening 32 of the housing 14. The first and second protrusions 90, 92 may each have a lip portion 90a, 92a disposed at distal end thereof. In some embodiments, the lip portions 90*a*, 92*a* may include barbs that are oriented so as to engage the shoulders 94, 96 of the housing 14 of the circuit breaker 6.

Thus arranged, as the circuit breaker 6 is pressed into engagement with the base pan 4 so that the line phase electrical connection 36 of the circuit breaker 6 electrically contacts the line phase electrical connection 12 of the base pan 4, the bottom surface 30 of the housing 14 can engage the first and second protrusions 90, 92 such that the protrusions 90, 92 flex laterally outward as the bottom surface 30 moves toward the base pan 4. As the circuit breaker 6 approaches full engagement with the base pan 4, the lip portions 90*a*, 92*a* pass over the shoulders 94, 96 allowing the first and second protrusions 90, 92 to flex back laterally inward as the lip portions 90*a*, 92*a* engage the shoulders 94, 96. In the engaged position the lip portions 90*a*, 92*a* overlie the shoulders 94, 96, thereby preventing reverse movement of the circuit breaker 6 with respect to the base pan 4.

In addition to preventing unintended reverse movement of the circuit breaker 6 with respect to the base pan 4, it will be appreciated that the first and second protrusions 90, 92 can prevent movement of the first end 24 of the circuit breaker 6 in a direction parallel to the longitudinal axis A-A of the panel 2.

It will also be appreciated that although the illustrated embodiment includes protrusions 90, 92 on the base pan 4 that are engageable with shoulders 94, 96 on the circuit breaker 6, the arrangement could be reversed so that the protrusions could be provided on the circuit breaker and the shoulders could be provided on the base pan.

As will be understood, it may be important to maintain a minimum dielectric spacing between load phase and load neutral electrical connections on the circuit breaker 6 and the panel 2. With the disclosed arrangement, a barrier member 88 (FIGS. 5 and 14) may be disposed on the second end 26 of the housing 14 between load phase electrical connection opening 38 and a load neutral electrical connection opening 39. This barrier member 88 is thus positioned between the load phase electrical connection 44 and the load neutral electrical connection 46 of the circuit breaker 6. The barrier member 88 may also serve to provide a desired dielectric spacing between the load phase electrical connection 40 and the load neutral electrical connection 42 of the base pan 4. Thus, in some embodiments, the base pan 4 may include a recess 98 disposed on the sidewall 66 of the base pan 4 between the load phase electrical connection 40 and the load neutral electrical connection 42 of the base pan 4. The recess 98 may be sized to receive the barrier member 88 therein when the circuit breaker 6 is engaged with the base pan 4.

Figure 14:
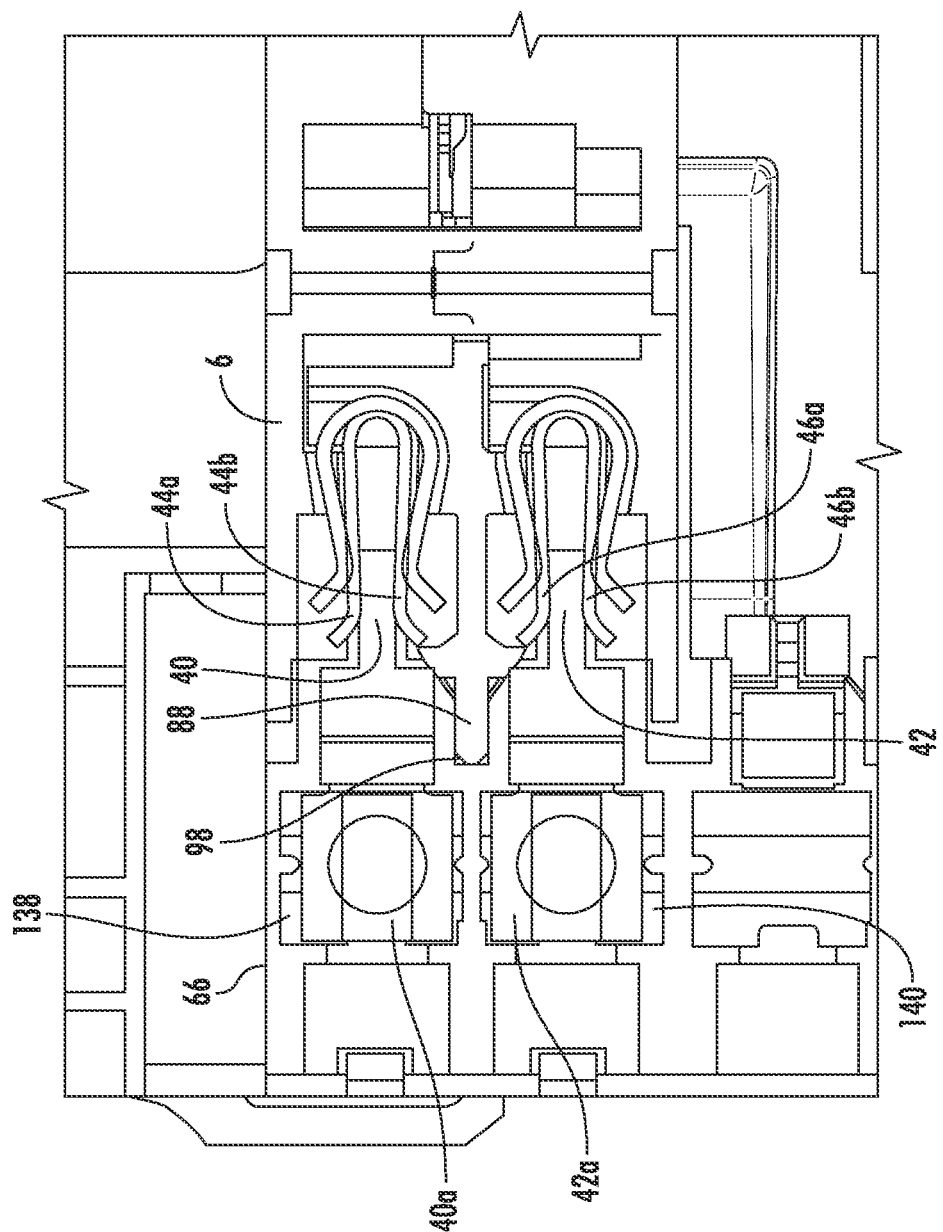
FIG. 14 is a cross-section view of an exemplary engagement between the base pan load phase and load neutral electrical connections and the circuit breaker load phase and load neutral electrical connections.

FIG. 14 shows the interposition of the barrier member 88 between the load phase electrical connection 40 and the load neutral electrical connection 42 of the base pan 4. The width, height, and thickness of the barrier member 88 may be selected to maintain a desired dielectric spacing, and to maintain appropriate over-air and surface distances in accordance with applicable regulatory requirements.

Figure 15A:
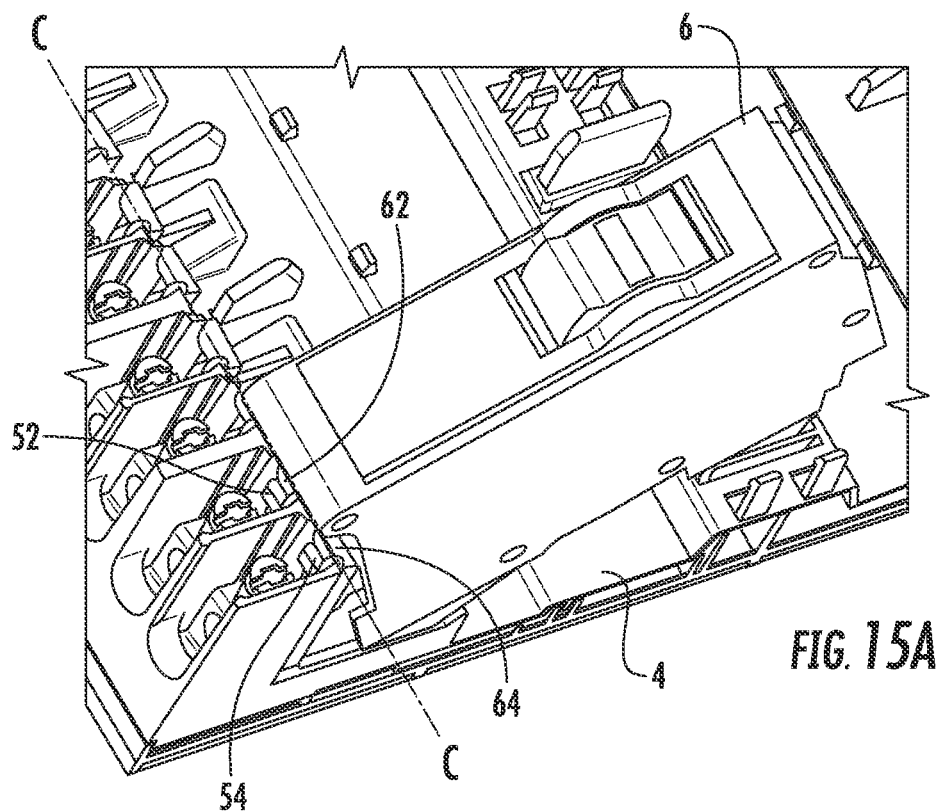
FIGS. 15A-17B are a series of isometric views showing the sequential positions of an exemplary circuit breaker being engaged with an exemplary base pan.
Figure 15B:
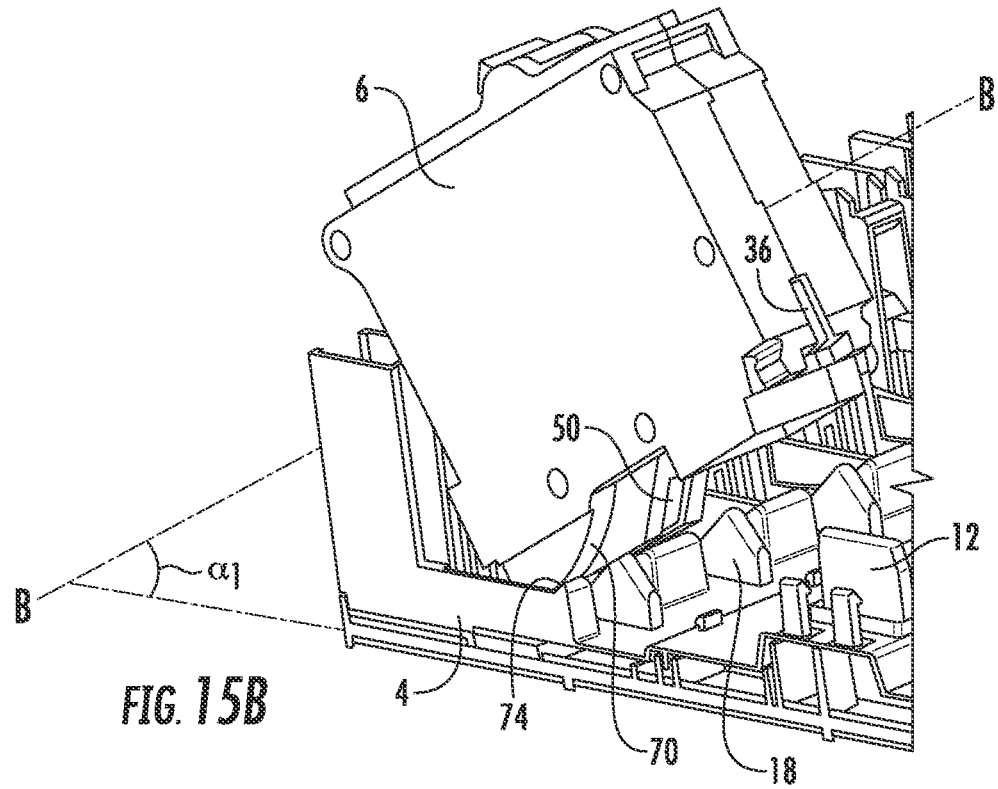

Referring now to FIGS. 15A-17B, an engagement sequence between the circuit breaker 6 and base pan 4 will be described in greater detail. As can be seen in FIGS. 15A and 15B, the first and second hook members 52, 54 of the circuit breaker 6 may be initially engaged with the first and second ribs 62, 64 disposed on the sidewall portion 66 of the base pan 4. In this initial engagement position, the circuit breaker 6 may be positioned so that its longitudinal axis B-B forms an oblique angle α1 with respect to a plane formed by the base pan 4 (e.g. with respect to the rear surface of panel 2). From the initial engagement position, the circuit breaker 6 may be rotated about the first and second ribs 62, 64 (i.e., about the hook recess axis C-C) to achieve a first rotational position or configuration (collectively referred to herein as position without the intent to limit) in which the load phase and load neutral electrical connections 44, 46 of the circuit breaker 6 electrically contact the load phase and load neutral electrical connections 40, 42 of the base pan 4. Although not visible in FIGS. 15A, 15B, the barrier member 88 disposed on the second end 26 of the circuit breaker 6 is received within the recess 98 of the base pan 4 between the load phase and load neutral electrical connections 40, 42 of the base pan 4. In this position, the first and second arcuate ribs 68, 70 of the circuit breaker 6 contact, and slide along, the corresponding first and second arcuate support surfaces 72, 74 of the base pan 4. In this position, only the load phase and load neutral electrical connections 44, 46 of the circuit breaker 6 are in electrical contact with the load phase and load neutral electrical connections 40, 42 of the base pan 4, respectively. The line phase and line neutral electrical connections 36, 50 of the circuit breaker 6 are not yet in electrical contact with the line phase and line neutral electrical connections 12, 18 of the base pan 4, respectively.

Figure 16A:
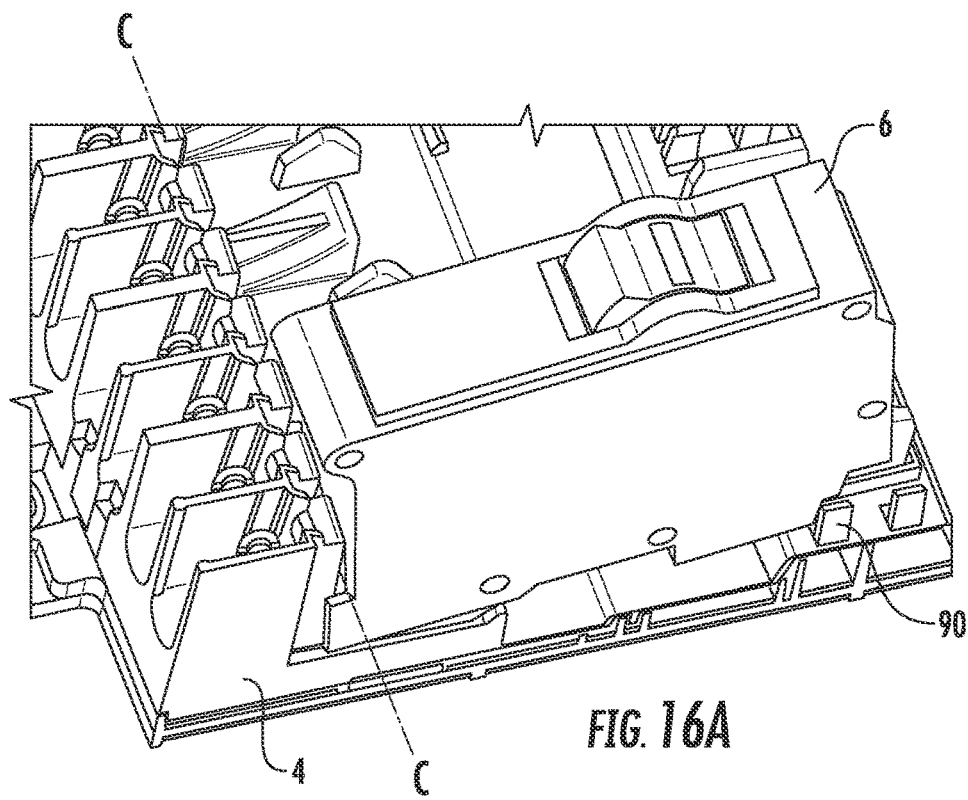
Figure 16B:
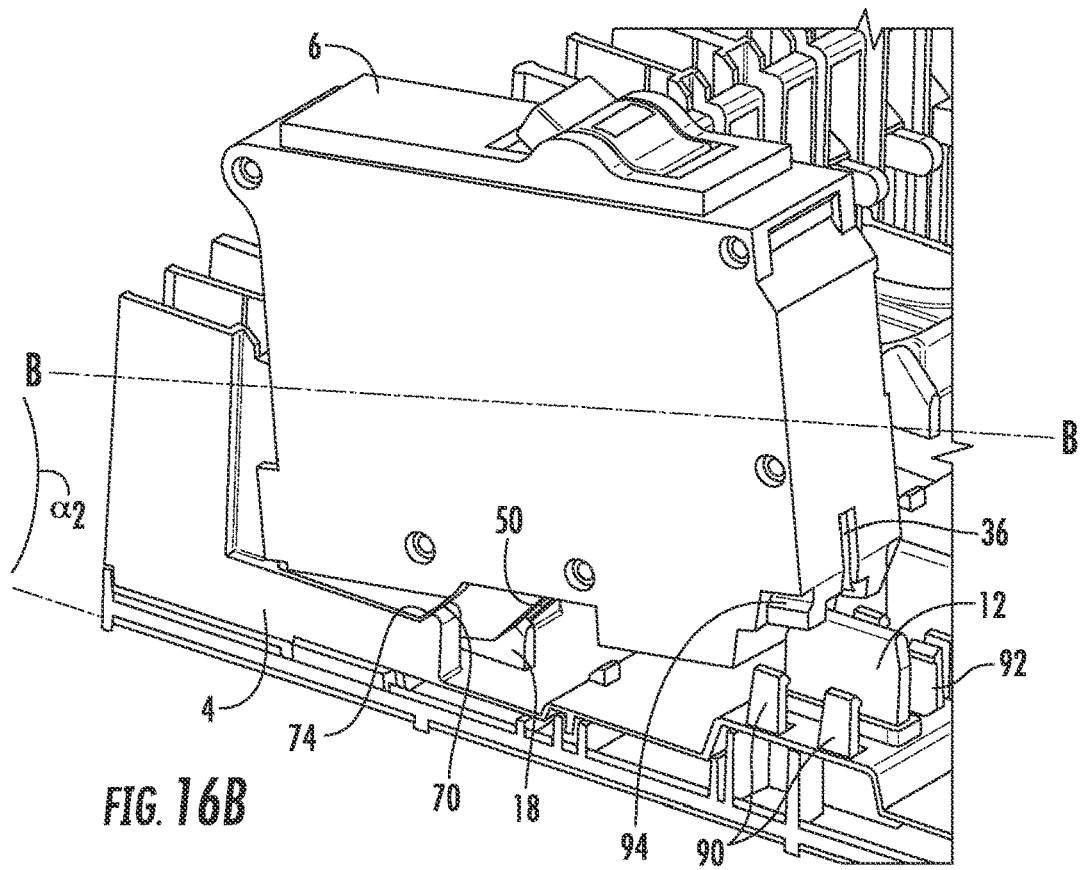

The circuit breaker 6 may be further rotated about the first and second ribs 62, 64 (i.e., axis C-C) to achieve a second rotational position in which the line neutral electrical connection 50 of the circuit breaker 6 establishes electrical contact with the line neutral electrical connection 18 of the base pan 4. This position is shown in FIGS. 16A, 16B. As can be seen, in the second rotational position, the angle α2 formed between the longitudinal axis B-B of the circuit breaker 6 and the plane formed by the base pan 4 is smaller than angle α1 of the first rotational position. As also can be seen, the line phase electrical connections 36, 12 of the circuit breaker 6 and base pan 4 are not yet in electrical contact in the second rotational position.

Figure 17A:
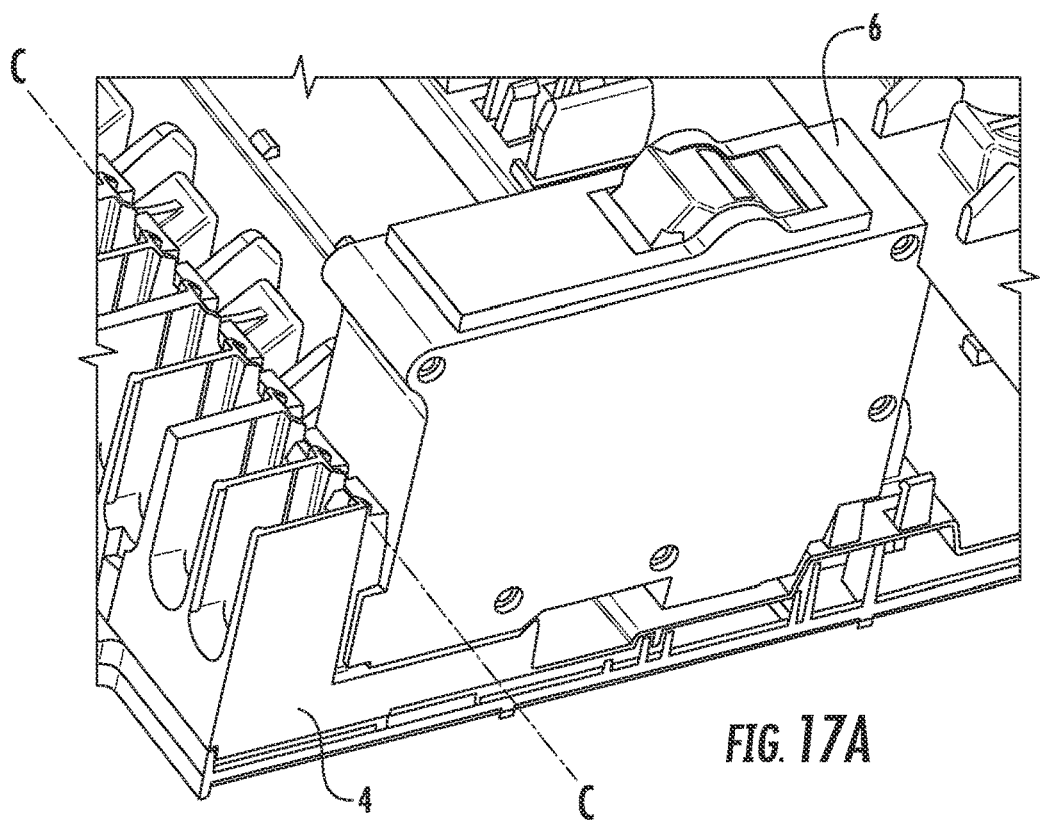
Figure 17B:
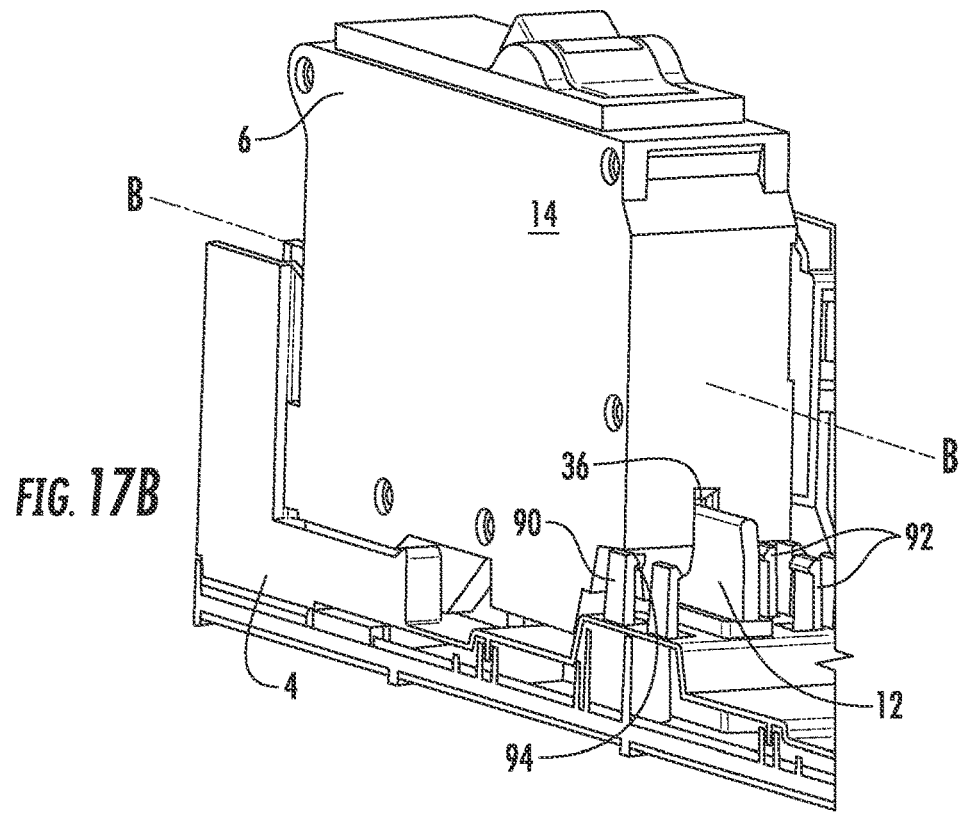
Figure 18:
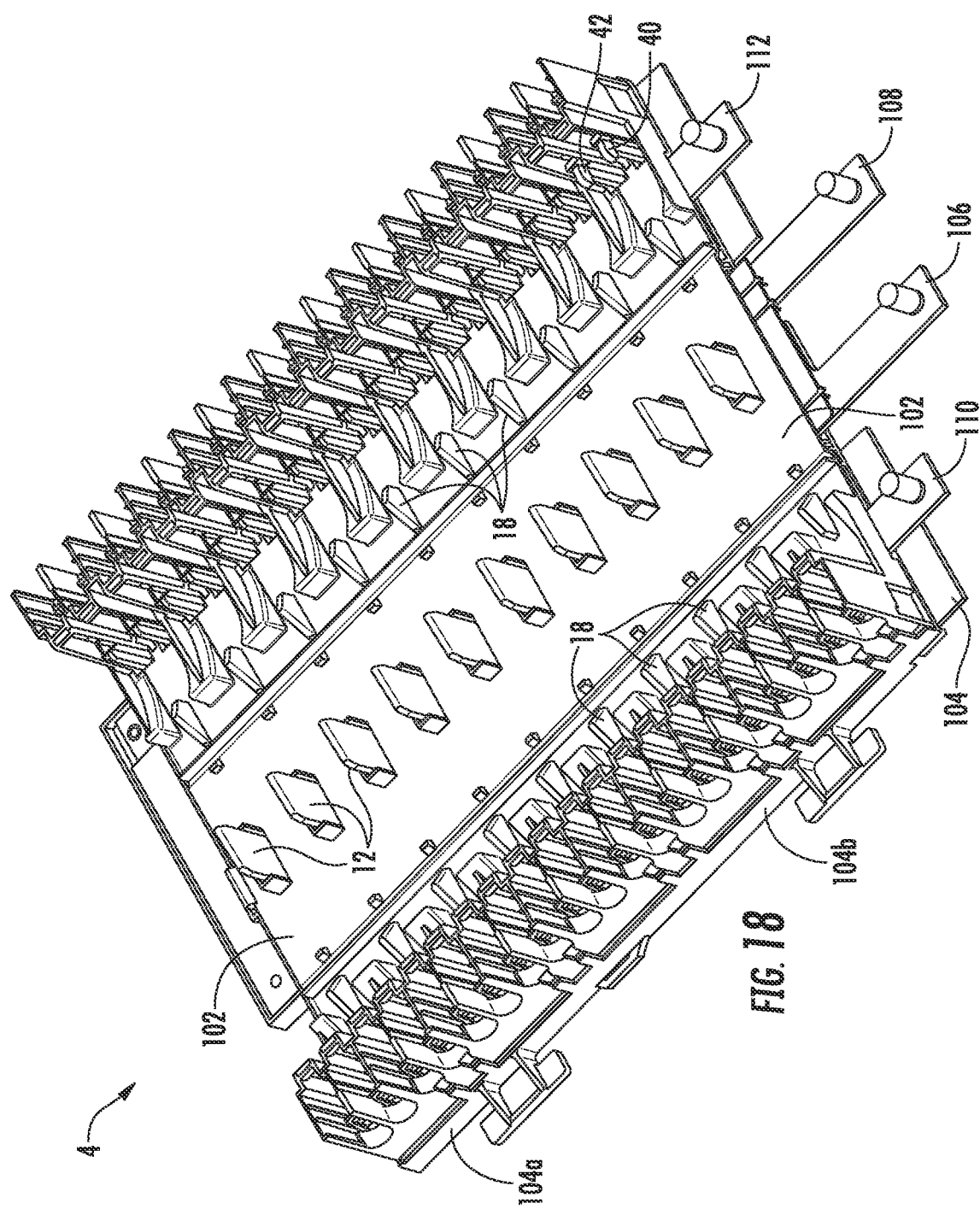
FIG. 18 is an isometric view of the base pan portion of the system of FIG. 1.

The circuit breaker 6 may be further rotated about the first and second ribs 62, 64 (i.e., axis C-C) to achieve a third rotational position in which the line phase electrical connection 36 of the circuit breaker 6 establishes electrical contact with the line phase electrical connection 12 of the base pan 4. This position is shown in FIGS. 17A, 17B. As can be seen, in the third rotational position the longitudinal axis B-B of the circuit breaker 6 is parallel to the plane formed by the base pan 4. As also can be seen, when the circuit breaker 6 is positioned in the third rotational position, the snap-fit connection between the circuit breaker 6 and the base pan 4 is completed, rotationally coupling the circuit breaker 6 to the base pan 4. Thus, in the third rotational position the first and second protrusions 90, 92 of the base pan 4 engage the first and second shoulders 94, 96 on the bottom surface 30 of the housing 14 of the circuit breaker 6. Finally, although not visible in FIGS. 17A and 17B, in the third rotational position the first and second supports 84, 86 of the base pan 4 are engaged with the load phase electrical connection opening 38 and load neutral electrical connection opening 39 of the circuit breaker, respectively.

In the third rotational position, the circuit breaker 6 is mechanically coupled to the base pan 4, and all electrical connections are engaged between the circuit breaker 6 and base pan 4. In addition, as will be appreciated, the mechanical interconnection features of the disclosed system require a user to follow a predetermined electrical connection coupling sequence, with line phase electrical connections 12, 36 of the base pan 4 and circuit breaker 6 being the last electrical connections to be connected. This ensures a safe coupling sequence in which the line phase electrical connections are only connected once all other electrical connections have been established.

Referring now to FIGS. 18-21, exemplary features of the disclosed base pan 4 will be described in greater detail. As previously described, the base pan 4 may include a plurality of features for engaging and retaining a plurality of circuit breakers 6 thereto. The base pan 4 may also include a plurality of line phase electrical connections 12, line neutral electrical connections 18, load phase electrical connections 40 and load neutral electrical connections 42 for electrically coupling to corresponding electrical connections of a plurality of circuit breakers 6 in the manner previously described.

In the illustrated embodiment, the base pan 4 can include a top pan portion 102 and a bottom pan portion 104 with first and second line phase bus bars 106, 108 and first and second line neutral bus bars 110, 112 sandwiched therebetween. The first and second line phase bus bars 106, 108 can include the plurality of line phase electrical connections 12, while the first and second line neutral bus bars 110, 112 can include the plurality of line neutral electrical connections 18.

The bottom pan portion 104 can be configured to receive the first and second line bus bars 106, 108 and the first and second line neutral bus bars 110, 112 to position the respective line phase and line neutral electrical connections 12, 18 in a desired position for engaging the circuit breakers 6 that will be engaged with the base pan 4.

Figure 19:
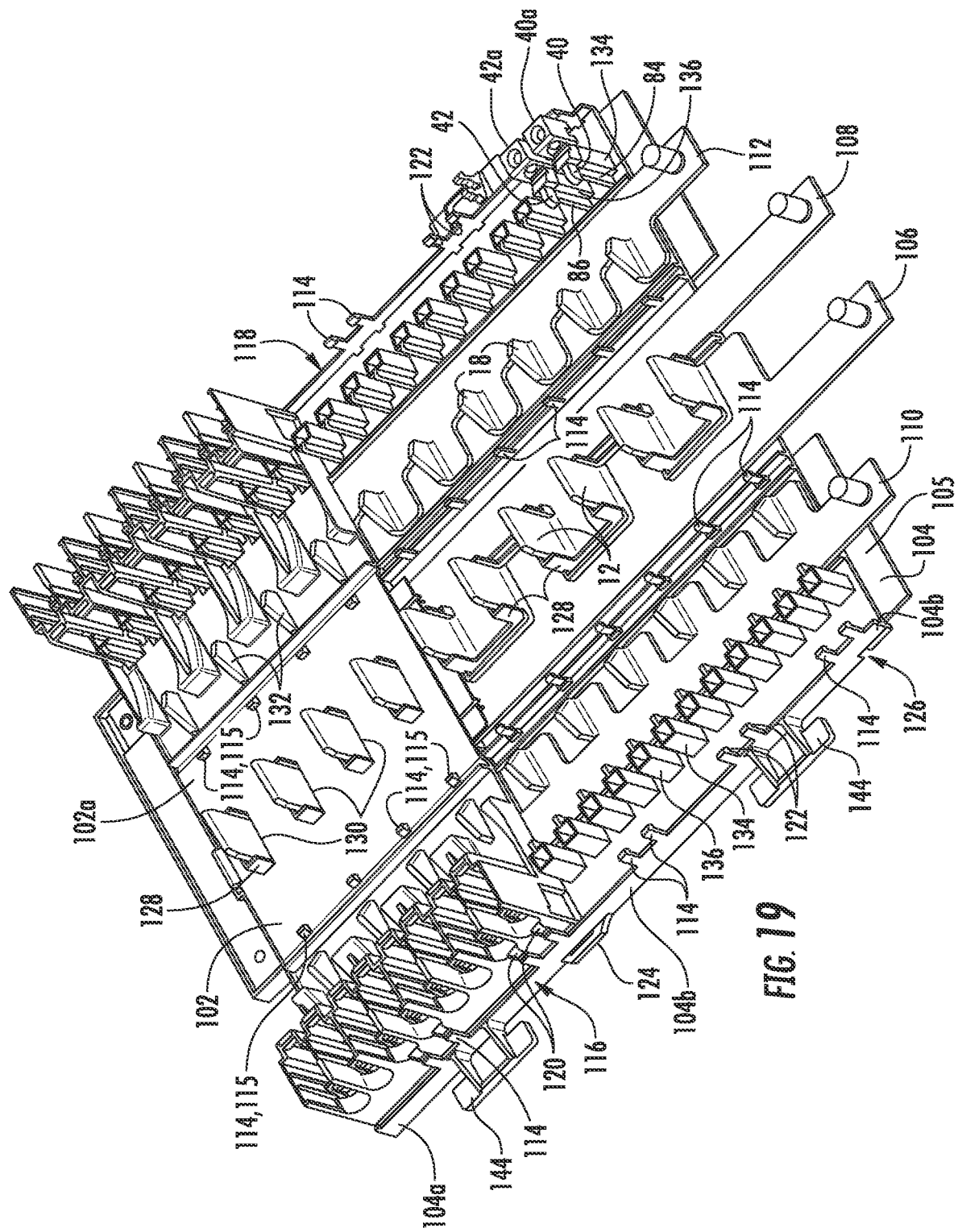
FIG. 19 is an isometric view of a partially disassembled base pan portion of FIG. 18.
Figure 20:
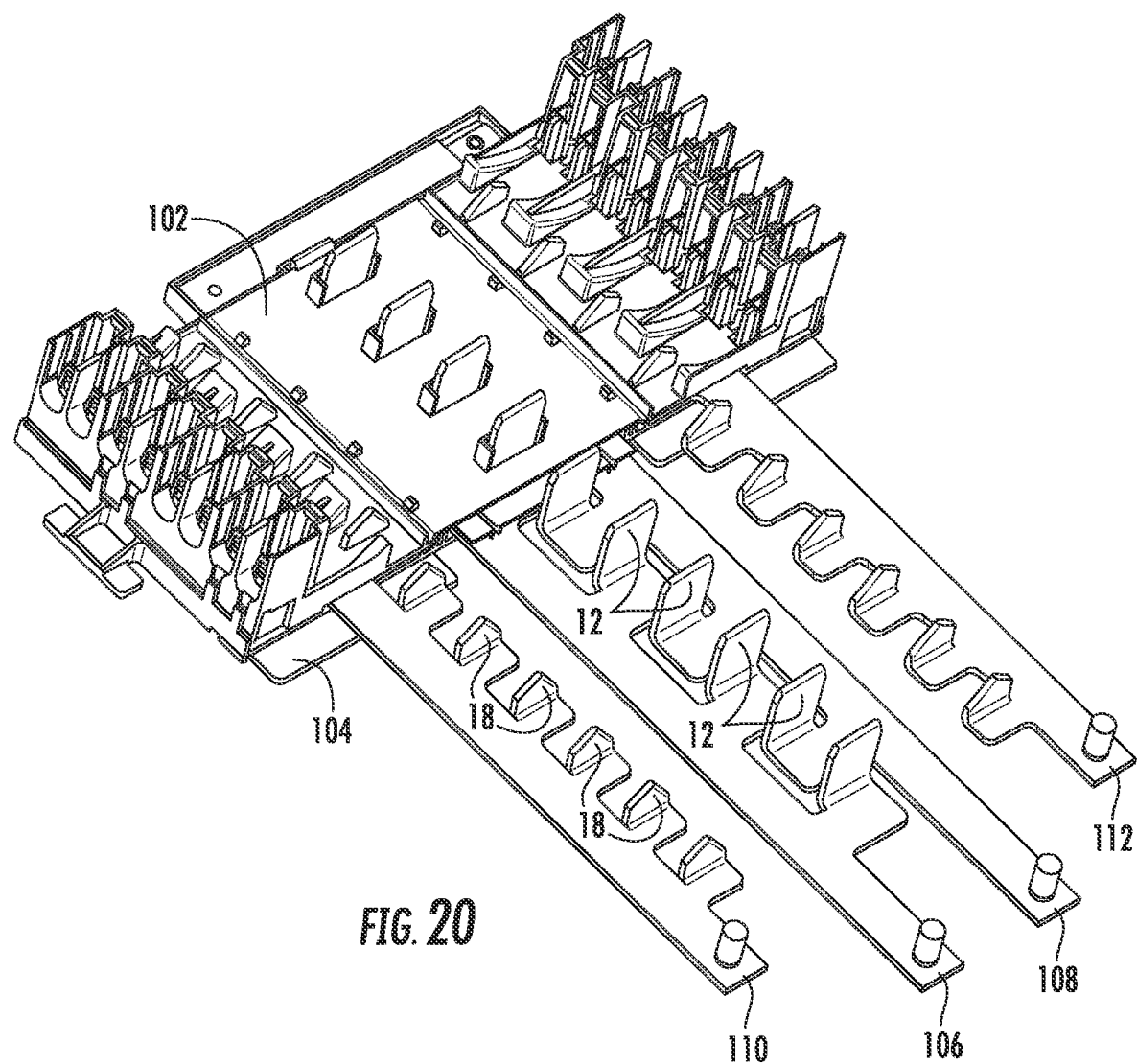
FIG. 20 is another isometric view of a partially disassembled base pan portion of FIG. 18.

The sandwich construction is best seen in FIGS. 19 and 20. In FIG. 19 a portion or module of the top pan portion 102 has been removed to better illustrate module 104b of the bottom pan portion 104, the first and second line bus bars 106, 108, and the first and second line neutral bus bars 110, 112. In FIG. 20, portions or modules of both the top pan 102 and the bottom pan portion 104 have been removed to better illustrate the first and second line bus bars 106, 108, and the first and second line neutral bus bars 110, 112. This modular arrangement enables a system to be built to accommodate a predetermined number of circuit breakers 6. Thus, larger or smaller numbers of circuit breakers 6 may be accommodated depending on the number of pan portion modules 102a, 104a, 104b, etc. installed. For example, in one embodiment, 8 breaker modules and 12 breaker modules may be constructed. In use, if a twenty-panel circuit breaker was desired, a main circuit breaker module would be connected to an 8-breaker module 104a and a 12-breaker module 104b. 8 breaker modules and 12 breaker modules are merely exemplary and not limiting, other sized modules can be used such as, for example, 5 breaker modules, 10 breaker modules, etc.

As will be appreciated, the top and bottom pan portions 102, 104 can be fastened together using any appropriate fastening technique, including gluing, welding, mechanical fasteners, and the like. In the illustrated embodiment, the top and bottom pan portions 102, 104 include a mechanical fastening arrangement in which a plurality of protrusions 114 extend outwardly from the bottom pan portion 104 on opposite first and second lateral sides 116, 118 of each bottom pan portion 104. In addition and/or alternatively, the bottom pan portion 104 may include rows of protrusions 114 extending outwardly from the bottom pan portion 104 located between the first and second lateral sides 116, 118. The protrusions 114 may extend toward the opposing top pan portion 102 and may extend thru corresponding openings 115 formed in the top pan portion 102 so that the protrusions 114 may be engageable with respective lips 120 or other surface features on the top pan portion 102 when the top pan portion 102 is engaged with the bottom pan portion 104. In some embodiments, the protrusions 114 can include barbs 122 that are oriented so as contact the lips 120 of the top pan portion 102.

Adjacent portions or modules 104a of the bottom pan portion 104 can also include features so that adjacent portions or modules 104a, 104b of the bottom pan portion 104 can engage each other. Any appropriate fastening technique could be used, including gluing, welding, mechanical fasteners, and the like. In one embodiment, the portions or modules 104a, 104b may include a mechanical fastening arrangement similar to that described above for fastening the top and bottom pan portions 102, 104 together. Thus, the first portion or module 104a can be provided with a projection 124 while the second module 104b can be provided with a corresponding recess 126. These projections 124 and recesses 126 can be provided on the first and second lateral sides 116, 118 of each bottom pan portion 104. Alternatively, and/or in addition, the modules 104a, 104b may include overlapping sections 105 (FIG. 19) so that, for example, bottom pan portion module 104b can sit on bottom pan portion 104. The bottom pan portion modules 104b can thus be snapped together by engaging the projection 124 of one module 104a with the recess 126 of an adjacent module 104b. In addition, protruding tabs and receiving pockets 123 (FIG. 19A) may be provided on individual portions to isolate current carrying members from each other and grounded/ungrounded metal surfaces to maintain appropriate over-air and surface distances in accordance with applicable regulatory requirements.

As can be seen, the bottom pan portion 104 may include collar members 128 that engage and align individual ones of the plurality of line phase electrical connections 12. In the illustrated embodiment, these collar members 128 can extend through corresponding openings 130 in the top pan portion 102. These collar members 128 may be sized and shaped to isolate current carrying members from each other and from grounded/ungrounded metal surfaces to maintain appropriate over-air and surface distances in accordance with applicable regulatory requirements. For example, collar members 128 may isolate first and second line phase bus bars 106, 108 from one another.

The bottom pan portion 104 may also have features for aligning the first and second line neutral bus bars 110, 112 and the plurality of line neutral electrical connections 18. In addition, the top pan portion 102 may include openings 132 through which the plurality of line neutral electrical connections 18 protrude.

Figure 19A:
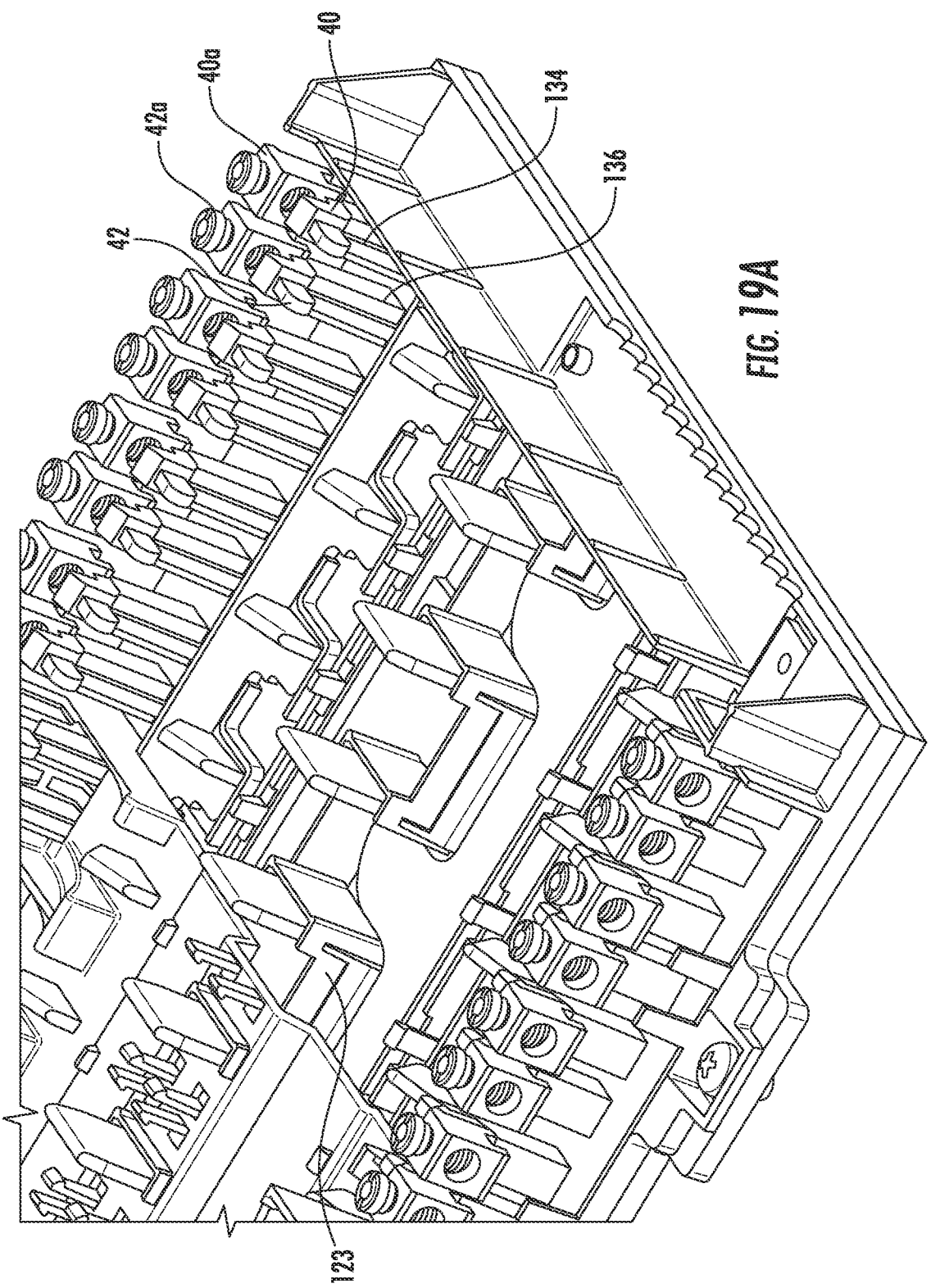
FIG. 19A is an isometric view of the load phase and load neutral electrical connections.

The bottom pan portion 104 may also provide support for the load phase and load neutral electrical connections 40, 42. Referring to FIG. 19A, in the illustrated embodiment, the bottom pan portion 104 may include first and second pedestal members 134, 136 upon which the load phase and load neutral electrical connections 40, 42 sit. In the illustrated embodiment, the first and second pedestal members 134, 136 may be positioned directly above the first and second lateral supports 84, 86 (FIGS. 10 & 11). Corresponding features of the top pan portion 102 may also engage the load phase and load neutral electrical connections 40, 42 to clamp the electrical connections in place. The captured arrangement of the load phase and load neutral electrical connections 40, 42 may be seen in FIG. 19A, in which wire engaging portions 40a, 42a of the load phase and load neutral electrical connections are received in correspondingly shaped recesses 138, 140 formed in the sidewall portion 66 of the base pan 4. In the illustrated embodiment, the wire engaging portions 40a, 42a are square, while the recesses 138, 140 are also square. It will be appreciated that this shape is not limiting, and that the wire engaging portions 40*a*, 42*a* and recesses 138, 140 may have non-square shapes. In some embodiments, a back portion of the load phase and load neutral electrical connections 40, 42 can have flanges that snap into the top pan portion 102 to maintain alignment of the electrical connections.

The disclosed design enables the load phase and load neutral electrical connections 40, 42 of the base pan 4 to be replaceable. Wires and screws can be used to connect to the wire engaging portions 40*a*, 42*a* after the wire engaging portions have been snapped into the recesses 138, 140 of the base pan 4. Further, in some embodiments the first and second pedestal members 134, 136 may be selected to have a height sufficient to provide a desired minimum predetermined spacing (i.e., air gap) between the metal panel 2 and the load phase and load neutral electrical connections 40, 42 to prevent arcing between the electrical connections and the panel.

Figure 21:
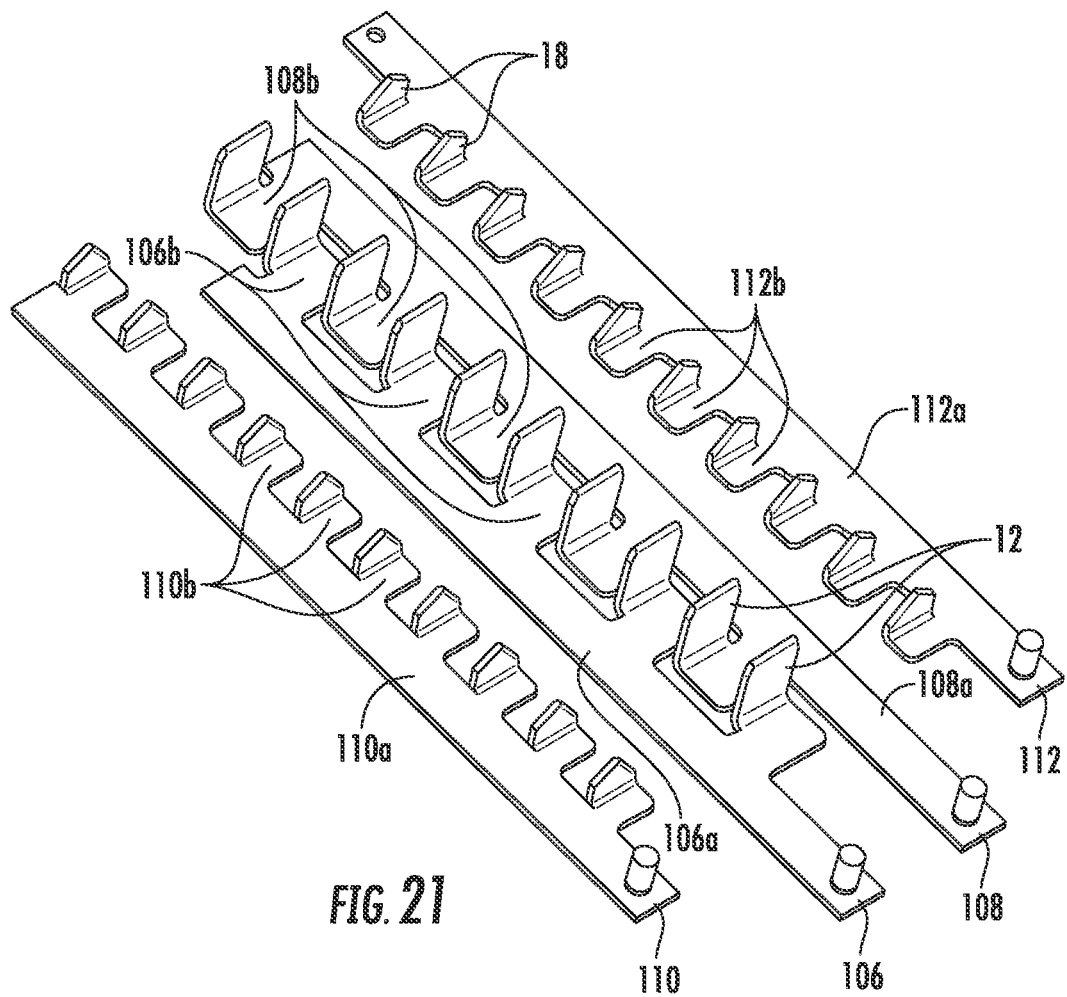
FIG. 21 is an isometric view of a plurality of buses of the base pan portion of FIG. 18.

FIG. 21 shows the bus bars 106, 108, 110, 112 separated from the top and bottom pan portions 102, 104 but still positioned in relation to each other. As can be seen each of the bus bars 106, 108, 110, 112 includes a generally flat bar portion 106*a*, 108*a*, 110*a*, 112*a* having respective longitudinal axes that, when installed, are oriented parallel to the longitudinal axis A-A of the panel 2 and base pan 4 (see FIG. 1). Each of the bus bars 106, 108, 110, 112 can also include a plurality of electrical connection extension portions 106*b*, 108*b*, 110*b*, 112*b* that extend perpendicular to the longitudinal axis of the respective bus bar, but within the same plane as the flat bar portions 106*a*, 108*a*, 110*a*, 112*a*. Each of the plurality of electrical connection extension portions 106*b*, 108*b*, 110*b*, 112*b* may end in a respective line phase electrical connection 12 (for the line phase bus bars 106, 108) or a respective line neutral electrical connection 18 (for the line neutral bus bars 110, 112). As can be seen each of the line phase electrical connections 12 and line neutral electrical connections 18 may be oriented perpendicular to the plane in which the associated electrical connection extension portions 106*b*, 108*b*, 110*b*, 112*b* lie. The line phase electrical connections 12 and line neutral electrical connections 18 are thus oriented so as to be received through the previously mentioned openings 130, 132 (FIG. 19) in the top pan portion 102.

As can be seen, the exposed portion of the line phase electrical connections 12 may be generally rectangular when viewed from down the longitudinal axis of the line neutral bus bars 110, 112, while the exposed portion of the line neutral electrical connections 18 may be generally triangular when viewed from the side. The triangular shape of the line neutral electrical connections 18 may reduce the insertion force associated with engaging the line neutral electrical connection 18 of the base pan 4 with the line neutral electrical connection 50 of the circuit breaker 6. The triangular shape of the exposed portion of the line neutral electrical connection 18 may be configured so that it does not adversely affect the electrical connection with the line neutral electrical connection 50 of the circuit breaker 6.

To assemble the base pan 4, the buses 106, 108, 110, 112 can be snapped into or otherwise engaged with the bottom pan portion(s) 104, and then the top pan portion(s) can be snapped onto the bottom pan portion(s) and buses. The assembled base pan 4 can then be screwed to the panel 2. In some embodiments, the base pan 4 will have tabs 144 that may include screw holes for receiving screws for securing the base pan 4 to the panel 2. Such tabs 144 are best seen in FIG. 19 where they are disposed on first and second lateral sides 116, 118 of the bottom pan portion 104.

It will be appreciated that for some circuit breakers (e.g., above 50 Amperes), a similar mechanical connection scheme can be used as described in relation to the circuit breaker 6 of FIGS. 4-9. The line phase and line neutral electrical connections may also be the same as described in relation to the circuit breaker 6 of FIGS. 4-9. Load phase and load neutral electrical connections, however, may be made by traditional wired connections.

Figure 22:
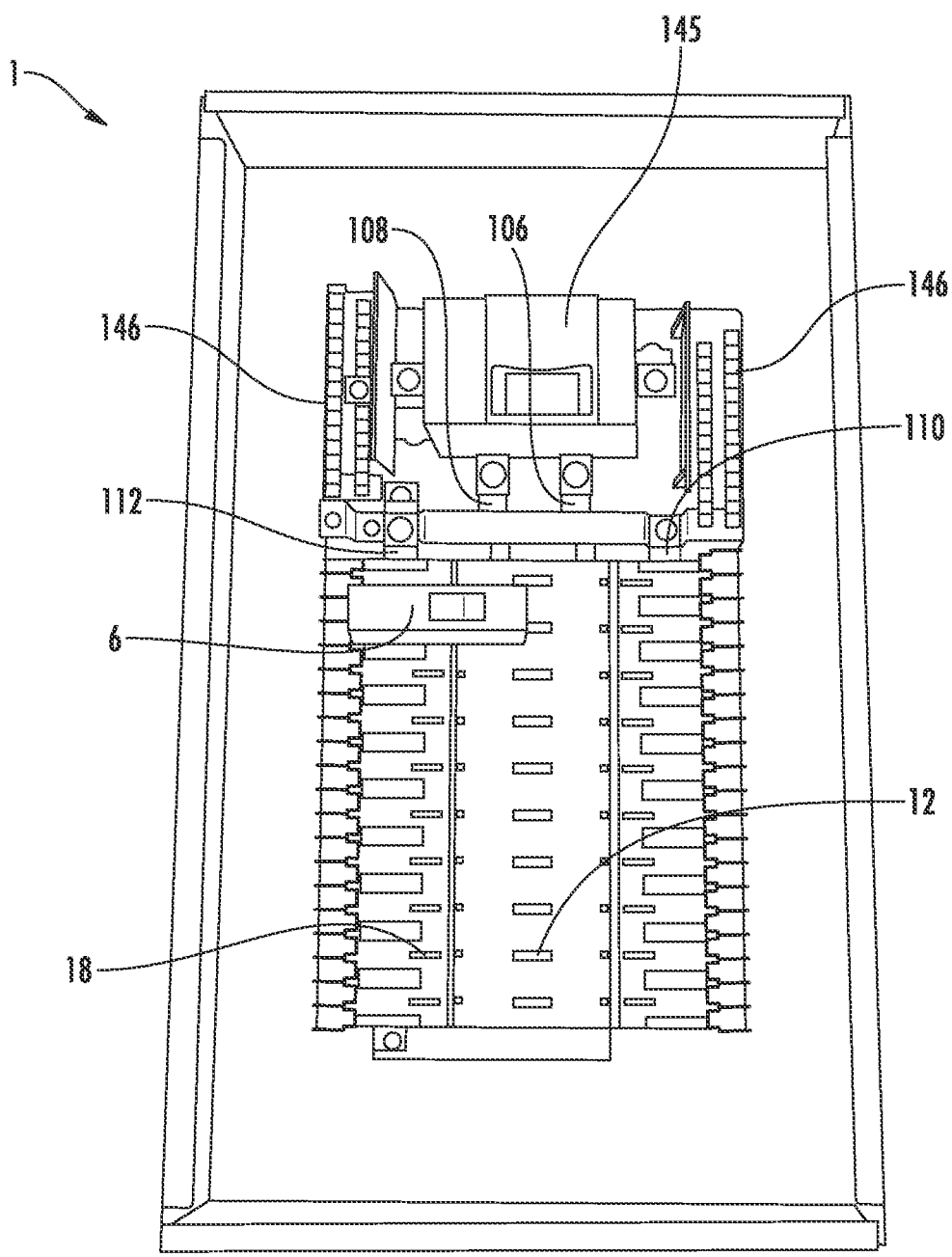
FIG. 22 is an isometric view of the exemplary circuit breaker and load center system including a main circuit breaker and an upper bus arrangement.
Figure 23:
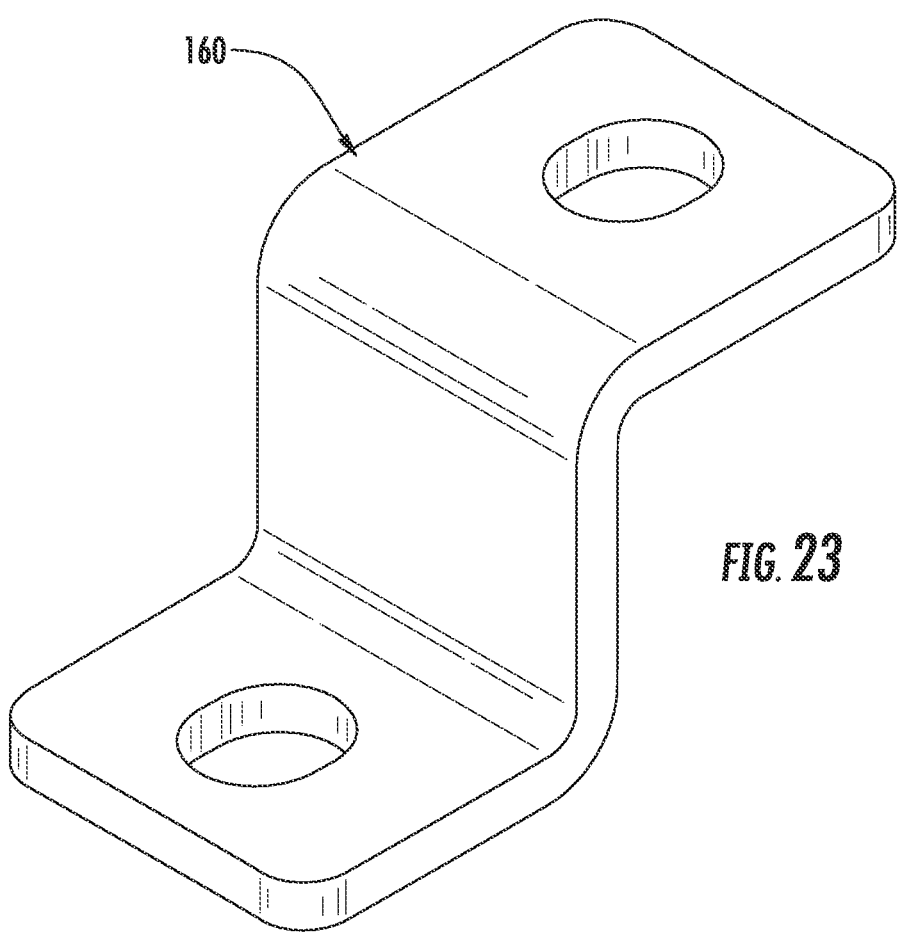
FIG. 23 is a perspective view of a ground/neutral link that may be incorporated into a load center system.
Figure 24:
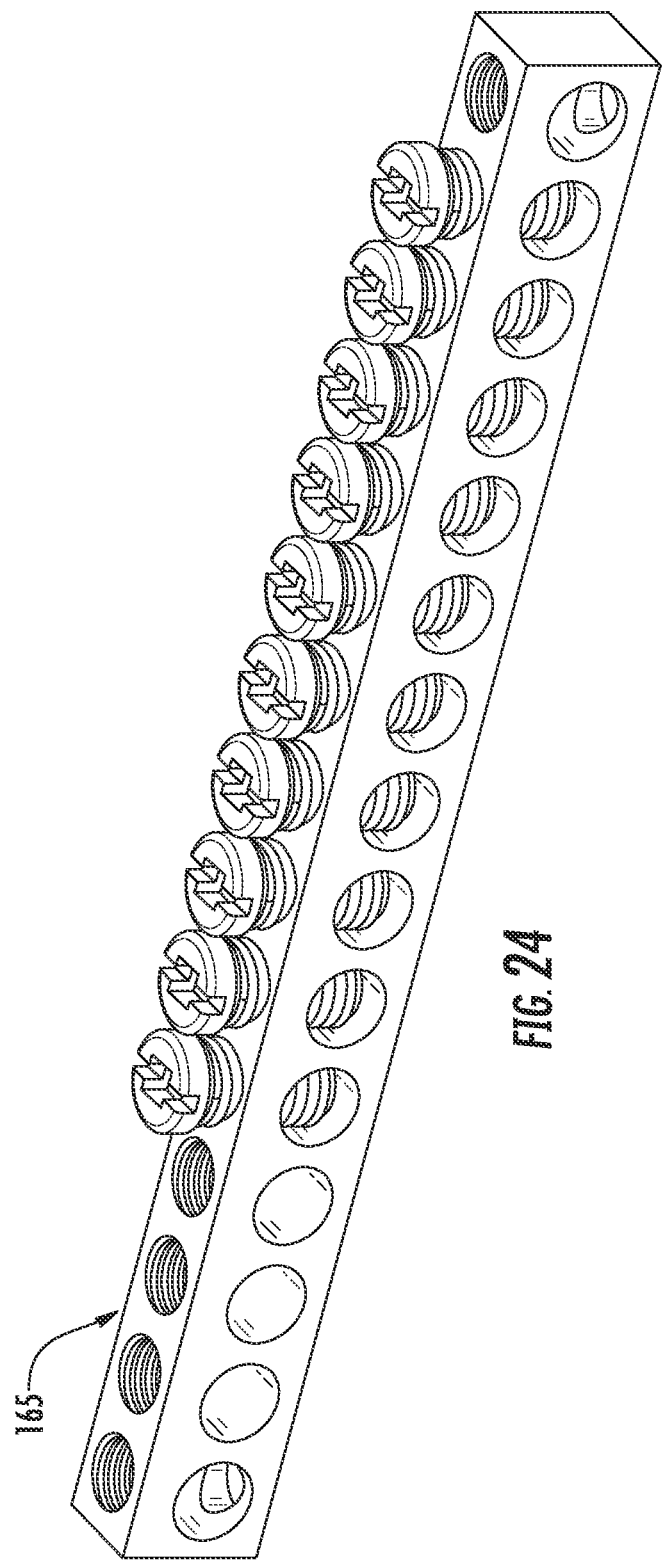
FIG. 24 is a perspective view of an additional neutral bar that may be incorporated into a load center system.

FIG. 22 shows an assembled exemplary circuit breaker and load center system 1 including a main circuit breaker 145 and an upper bus arrangement 146. In some embodiments, the neutral bar that connects the left and right neutral busses crosses over the line electrical connections via a protecting "bridge" that isolates the neutral busses from the phase busses to maintain desired over-air and surface distances in accordance with applicable regulatory requirements. In some embodiments, referring to FIG. 23, a ground/neutral link 160 can be provided. If panel 2 is used as a service entrance, the ground/neutral link 160 is used to bond the neutral busses to ground. If panel 2 is used as a sub-panel, the ground/neutral link 160 is removed in order to isolate the neutral busses from ground. As will be appreciated, the upper bus is optional accessory. Referring to FIG. 24, an additional neutral bar 165 may, in some instances, be provided at the bottom of the panel interior, and this additional neutral bar may attach to the extended neutral bus. In another embodiment, an additional ground bar may also be included.

Figure 25:
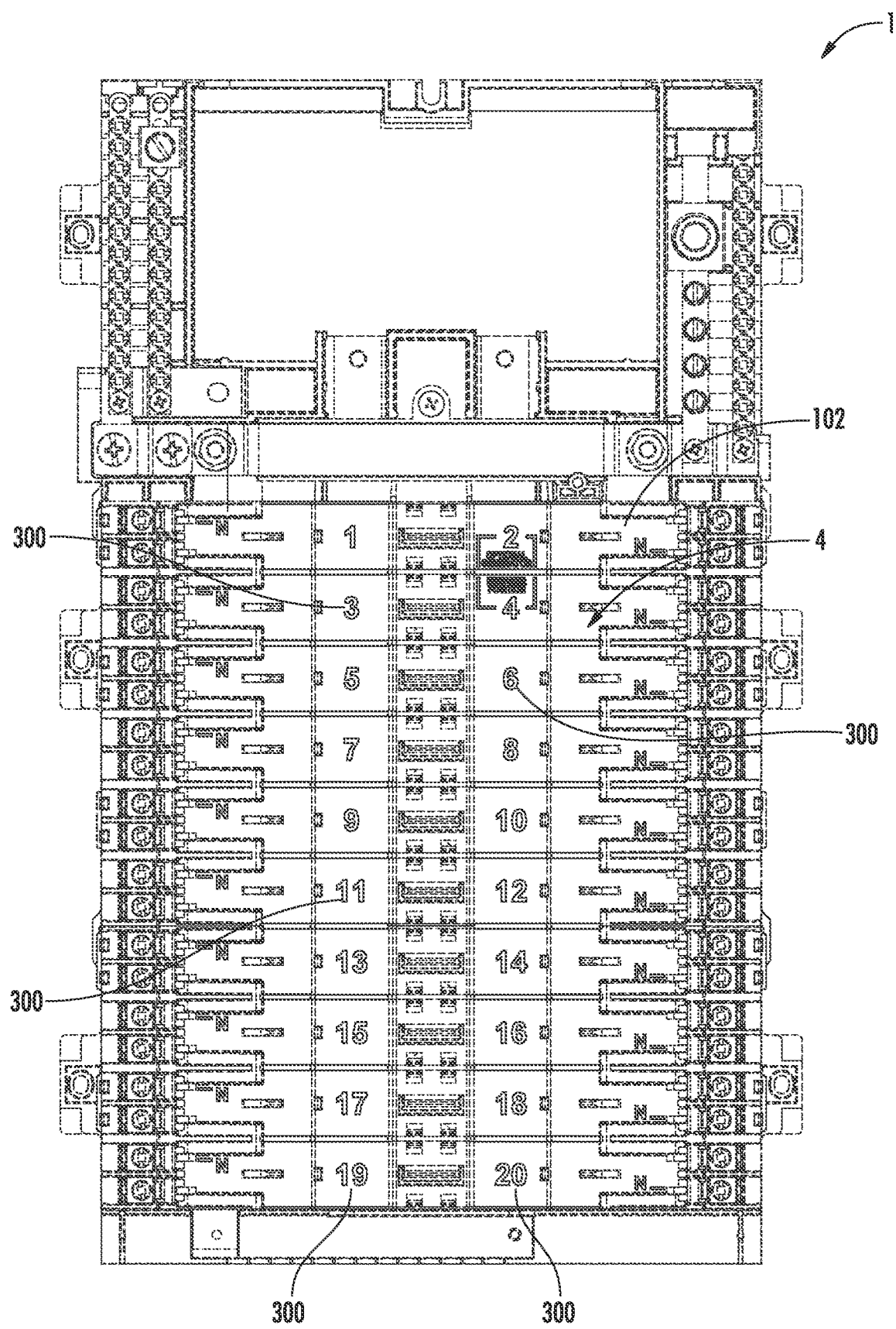
FIG. 25 is a front view of an exemplary base pan, the base pan including indicia per one aspect of the present disclosure.

Referring to FIG. 25, the top pan portion 102 may be arranged and configured to receive indicia or markings 300. In this manner, the top pan portion 102 can include information such as, for example, manufacturer name, model number, breaker number, etc. In addition, such indicia 300 can indicate an optional usage for a particular breaker location. On example of such would be to indicate to the user where a generator should be connected if so desired by the user. The indicia 300 may be formed in the top pan portion 102 by any means including, for example, laser etching.

Figure 26:
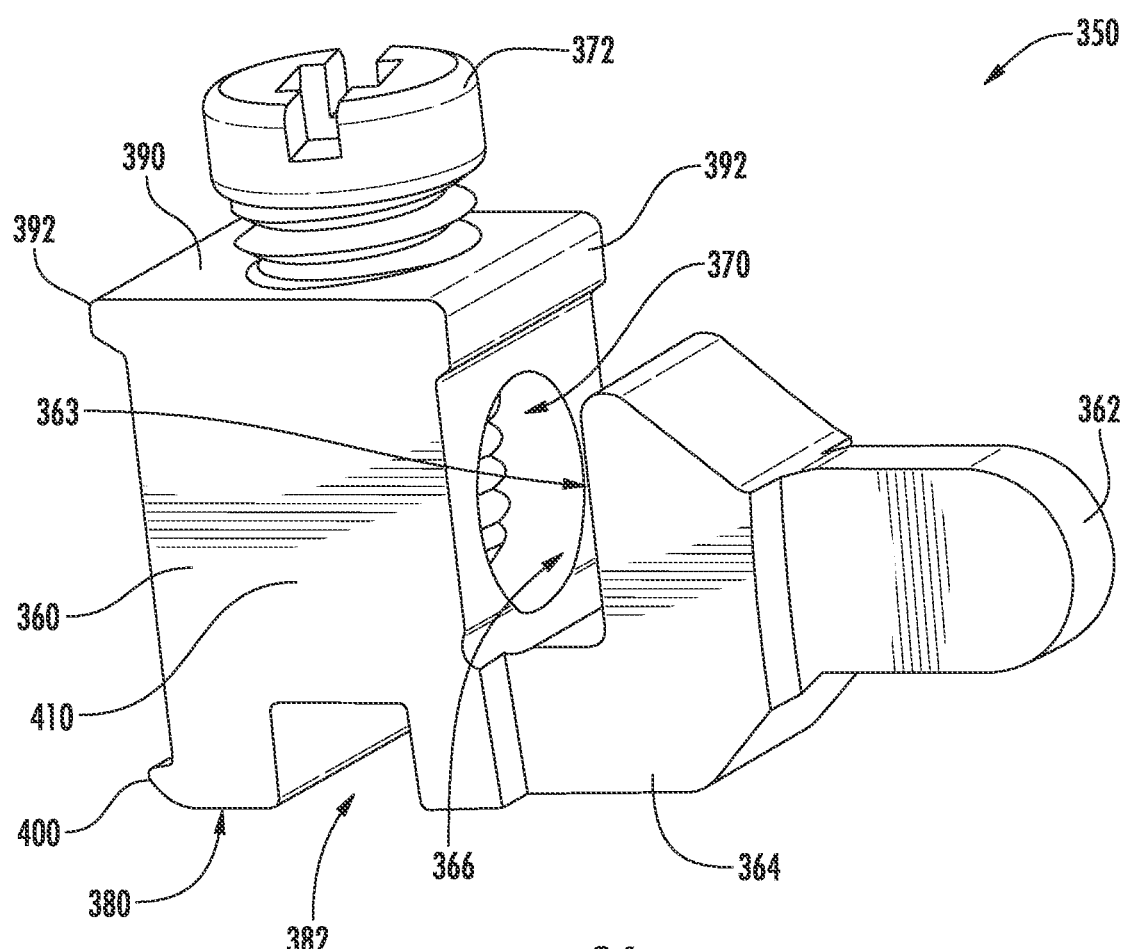
FIG. 26 is a side, perspective view of an exemplary electrical connection (e.g., terminal block) per one aspect of the present disclosure.

As previously mentioned, the base plan includes load phase and load neutral electrical connections 40, 42. Referring to FIGS. 26-28, the load phase and load neutral electrical connection 40, 42 may be in the form of terminal blocks 350. Referring to FIG. 26, the terminal block 350 may include a main block 360, a terminal portion 362 for contacting the electrical connections formed in the circuit breakers 6 and arm 364 for coupling the terminal portion 362 to the main body 360. The main body 360 may also include a passageway 370 extending therethrough for receiving an electrical wire (not shown). The main body 360 may also include a threaded bore extending generally transverse to the passageway 370 for receiving a set screw 372. In this manner, each terminal block 350 provides a connection mechanism for receiving an electrical wire. In one embodiment, the arm 364 may be arranged and configured to provide an opening 366 between the main body 360 and the terminal portion 362. In this manner, during use, visual access may be provided to assist the user to view when the electrical wire has been fully inserted. Moreover, the arm/terminal portion 364, 362 may be configured to provide a stop surface 363 for preventing the wire from being inserted too far.

Referring to FIGS. 26-28, the terminal blocks 350 may also include a number of features for interacting with the pedestal members 134, 136 upon which they sit to ensure that the terminal blocks 350 do not move, are capable of withstand higher torque, and accept multiple different electrical wire sizes. For example, the main body 360 may include a recess 382 formed in a bottom surface 380 thereof for receiving a projection 384 extending from the pedestal members 134, 136. Inserting the projection 384 into the recess 382 formed in the terminal block 350 may provide increase bearing surface thereby decreasing surface pressures during torqueing. In addition, the main body 360 may include one or more surfaces 392 formed along the top surface 390 of the main body 360 for contacting corresponding surfaces or walls 394 formed on the pedestal members 134, 136 to prevent the terminal blocks 350 from moving back and forth. Moreover, the main body 360 may include a projection 400 extending from the bottom surface 380 along a rear surface thereof for engaging a recess 402 formed in the pedestal members 134, 136. The interaction between the projection 400 and the recess 402 assist in securing the terminal block 350 in position while enabling the terminal block 350 to be removed, for example, if required for replacement. In one embodiment, the projection 400 may be held in the recess 402 via a corresponding hook or snap 404. In addition, first and second sidewalls 410, 412 of the main body 360 and arm 364 may be arranged and configured to interact with walls 415 formed in the pedestal members 134, 136 to provide additional support in minimizing movement of the terminal blocks 350. In addition, the walls 415 formed in the pedestal members 134, 136 may be used to provide additional over air and over the surface dielectric spacing when positioning the terminal blocks 350 horizontally adjacent to one another.

The circuit breaker and load center system of the present disclosure provides numerous advantages. One aspect of the present disclosure is that the circuit breaker and load center system enables an installer to wire phase and neutral to terminal blocks near each individual breaker instead of the neutrals all being wired to a neutral bus. Another aspect of the present disclosure concerns two-pole breakers. In the case of a two-pole circuit breaker, the two-pole circuit breaker is positioned adjacent sets of terminal blocks (each having a phase and neutral terminal block). However, while the two-pole breaker requires connection to two phase terminal blocks, the two-pole circuit breaker requires a connection to only one neutral terminal block. As such, to reduce the amount of dielectric spacing required, the two-pole breaker in the present embodiment is coupled to both phase and neutral of the first set of terminal blocks and only the phase of the second set of terminal blocks (without a connection to the neutral of the second set of terminal blocks). Alternatively, the two-pole breaker may be coupled to only the phase of the first set of terminal blocks and both phase and neutral of the second set of terminal blocks (without a connection to the neutral of the first set of terminal blocks).

The features disclosed in the foregoing description, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A load center having a plurality of circuit breaker spaces, each of the circuit breaker spaces being configured to receive a circuit breaker, the load center comprising:
    first and second terminal blocks arranged and configured within each of the plurality of circuit breaker spaces, wherein each of the plurality of circuit breaker spaces is disposed at least partially within a base pan of the load center, wherein each of the first and second terminal blocks are configured to contact the circuit breaker positioned within the circuit breaker space;
    wherein
        one of the first and second terminal blocks is arranged and configured to selectively enable a circuit branch load phase wire to be coupled to the one of the first and second terminal blocks; and
        the other one of the first and second terminal blocks is arranged and configured to selectively enable a circuit branch load neutral wire to be coupled to the other one of the first and second terminal blocks;
    wherein each terminal block includes:
        a body portion arranged and configured to receive a respective one of the circuit branch load phase or neutral wires; and
        a terminal portion being arranged and configured to contact a corresponding electrical connection formed in the circuit breaker positioned within the circuit breaker space.

2. The load center of claim 1, wherein the body portion includes an aperture extending therethrough configured to receive the circuit branch load phase wire or the load neutral wire and a threaded bore in communication with the aperture, the threaded bore being arranged and configured to receive a set screw to secure the received wire within the aperture.

3. The load center of claim 2, wherein the body portion includes a top surface, a bottom surface opposite the top surface, a first side surface, and a second side surface opposite the first side surface, each terminal block further comprising an arm coupled to the terminal portion and the body portion, the arm extending laterally from the second side surface to the terminal portion.

4. The load center of claim 3, wherein the aperture extends from the first side surface to the second side surface.

5. The load center of claim 4, wherein the threaded bore extends from the top surface into communication with the aperture.

6. The load center of claim 4, wherein the arm is arranged and configured to provide a space between the second side surface of the body portion and the terminal portion.

7. The load center of claim 6, wherein the terminal portion comprises a stop surface, wherein the space provided by the arm is positioned between the second side surface of the body portion and the stop surface and the stop surface is positioned such that the received wire contacts the stop surface.

8. The load center of claim 3, wherein the body portion includes a recess formed in the bottom surface thereof, the recess arranged and configured to receive a projection extending from a pedestal member positioned in the load center.

9. The load center of claim 1, wherein the first and second terminal blocks are replaceable.

10. A load center comprising:
    a base pan having a plurality of circuit breaker spaces, each of the circuit breaker spaces being configured to receive a circuit breaker, each of the plurality of circuit breaker spaces is disposed at least partially within the base pan and include first and second pedestal members extending from the base pan; and
    first and second terminal blocks arranged and configured within each of the plurality of circuit breaker spaces, wherein each of the first and second terminal blocks are configured to contact the circuit breaker positioned within the circuit breaker space;
    wherein one of the first and second terminal blocks is arranged and configured to selectively enable a circuit branch load phase wire to be coupled to the one of the first and second terminal blocks;

the other one of the first and second terminal blocks is arranged and configured to selectively enable a circuit branch load neutral wire to be coupled to the other one of the first and second terminal blocks;

wherein the first and second terminal blocks sit on the first and second pedestal members, respectively; and wherein each terminal block includes:

a body portion arranged and configured to receive a respective one of the circuit branch load phase or neutral wires; and a terminal portion being arranged and configured to contact a corresponding electrical connection formed in the circuit breaker positioned within the circuit breaker space.

11. The load center of claim 10, wherein the body portion includes an aperture extending therethrough configured to receive the circuit branch load phase wire or the load neutral wire and a threaded bore in communication with the aperture, the threaded bore being arranged and configured to receive a set screw to secure the received wire within the aperture.

12. The load center of claim 11, wherein the body portion includes a top surface, a bottom surface opposite the top surface, a first side surface, and a second side surface opposite the first side surface, each of the terminal blocks further comprises an arm coupled to the terminal portion and the body portion, the arm extending laterally from the second side surface to the terminal portion.

13. The load center of claim 12, wherein the aperture extends from the first side surface to the second side surface.

14. The load center of claim 13, wherein the threaded bore extends from the top surface into communication with the aperture.

15. The load center of claim 14, wherein the arm is arranged and configured to provide an opening or space between the second side surface of the body portion and the terminal portion.

16. The load center of claim 15, wherein terminal portion comprises a stop surface positioned such that the received wire contacts the stop surface to prevent the received wire from being over inserted.

17. The load center of claim 12, wherein the body portion includes a recess formed in the bottom surface thereof, the recess arranged and configured to receive a projection extending from one of the first and second pedestal members.

18. The load center of claim 10, wherein the body portion include one or more surfaces formed along a top surface of the body portion, the one or more surfaces extending laterally from the body portion, the one or more surfaces arranged and configured to contact a corresponding surface or wall formed on one of the first and second pedestal members to prevent the terminal blocks from moving.

19. The load center of claim 10, wherein the body portion includes a projection extending from a bottom surface thereof, the projection arranged and configured to engage a recess formed in one of the first and second pedestal members to secure the terminal block.

20. The load center of claim 19, wherein the body portion of the terminal blocks further comprise first and second sidewalls arranged and configured to interact with walls formed on one of the first and second pedestal members to minimize movement of the terminal block.

21. The load center of claim 10, wherein the base pan includes first and second lateral supports, the first and second pedestal members positioned directly above the first and second lateral supports.

22. The load center of claim 10, wherein the base pan includes a bottom pan portion and a top pan portion positioned on the bottom pan portion, the first and second pedestal members residing on the bottom pan portion.

23. The load center of claim 22, wherein the first and second terminal blocks are received in correspondingly shaped recesses formed in the bottom pan portion.

24. The load center of claim 22, wherein the first and second terminal blocks include flanges to engage the top pan portion.

25. The load center of claim 10, wherein the first and second pedestal members are arranged and configured to provide an air gap between a panel and the first and second terminal blocks to prevent arcing.

26. The load center of claim 10, wherein the first and second terminal blocks are replaceable.

* * * * *